(12) United States Patent
Margulis et al.

(10) Patent No.: US 7,421,716 B1
(45) Date of Patent: Sep. 2, 2008

(54) SYSTEM AND METHOD FOR PROVIDING COMPOSITE APPLICATIONS

(75) Inventors: Efim Margulis, Ashdod (IL); Moshe Ilan Rozenblat, Lexington, MA (US)

(73) Assignee: Cerylion, Inc., Burlington, MA (US)

( * ) Notice: Subject to any disclaimer, the term of this patent is extended or adjusted under 35 U.S.C. 154(b) by 513 days.

(21) Appl. No.: 11/054,253

(22) Filed: Feb. 9, 2005

(51) Int. Cl.
*G06F 13/00* (2006.01)

(52) U.S. Cl. .................. 719/331; 719/316; 719/332

(58) Field of Classification Search .......... 719/331, 719/332, 316
See application file for complete search history.

(56) References Cited

U.S. PATENT DOCUMENTS

| | | | |
|---|---|---|---|
| 5,872,973 A * | 2/1999 | Mitchell et al. | 719/332 |
| 5,983,021 A * | 11/1999 | Mitrovic | 717/158 |
| 6,675,227 B1 * | 1/2004 | Gavrilo et al. | 719/316 |
| 6,757,720 B1 * | 6/2004 | Weschler, Jr. | 709/220 |
| 7,246,358 B2 * | 7/2007 | Chinnici et al. | 719/315 |
| 7,266,821 B2 * | 9/2007 | Polizzi et al. | 718/100 |
| 2006/0150172 A1 * | 7/2006 | Heath et al. | 717/162 |

* cited by examiner

Primary Examiner—Andy Ho
(74) Attorney, Agent, or Firm—David A. Dagg

(57) ABSTRACT

A system and method for providing composite applications for software-based systems that uses a built-in application model having at least one general purpose object type, and providing dynamic late-binding of object implementations through an object typing system decoupled from pre-run time program code, using persistently stored objects. The application model may require that program objects in a conformant application be instances of a predefined active object type, or optionally instances of a predefined reactive object type. The application model enables integration of applications into composite applications, and further integration of composite applications into subsequently defined systems. The run-time object typing system for persistently stored objects is independent of the class typing system that is defined at compile-time or link-time, and enables convenient and practical modifications during development, deployment and maintenance of composite applications.

56 Claims, 16 Drawing Sheets

SYSTEM AND METHOD FOR PROVIDING COMPOSITE APPLICATIONS

FIELD OF THE INVENTION

The present invention relates generally to software-based system development and integration, and more specifically to a system and method for developing, deploying and maintaining composite applications.

BACKGROUND OF THE INVENTION

The speed at which many fundamental business operations are being performed continues to increase, in some cases by several orders of magnitude. Increased operational velocity may be found in many, varied business areas. These include, for example, stock trading analytics, airline operations, call center inquiries, financial position tracking, supply chain updating, document transfer, phone activation, data warehouse refreshing, trade settlement, build-to-order personal computers, and many others. Most of the increases in speed of operations are integrally tied to the use of information technology. However, increases in business operation velocity have occurred while at the same time a plateau is being reached with regard to the speed at which information technology software can adapt to changes. Since software is the core underlying information technology capabilities, and since the importance of information technology to most businesses is increasing, this is a significant concern.

In many aspects, the practice of software development remains relatively "low-tech". Production of software applications at the development stage is non-scalable. Software quality is generally decreasing. As a result, the speed at which information technology can respond to a need for new or improved functionality is often much slower than the speed at which the business itself is operating.

It is increasingly apparent that the old model of simply adding new software applications to meet each new business need no longer holds. Enterprises believe they have more than enough software applications. Some of this software infrastructure is considered an asset, while other parts are seen as liabilities. Thus software integration has become at least as important as new software development. However, the practice of software integration is substantially less developed than that of software development. The results of software integration are accordingly often less sustainable than those of software development, and the two disciplines for the most part remain orthogonal practices.

Some attempts at improving software integration have been made addressing the distribution and use of software components. The emerging standards and technologies generally referred to as "Web Services" exemplify such efforts. Web Services standards provide an approach for documenting software interfaces using a specific XML structure (WSDL). Web Services infrastructure technologies provide a distribution system for these documented interfaces (SOAP/XML, UDDI). By helping facilitate standard access to exposed components, Web Services may accelerate component re-use by new or different applications. However, Web Services technologies fail to address key issues in the software production process that are likely to cause extensive re-use of software components to increasingly compromise the quality and durability of both the original applications providing the re-used components, and of the new applications that consume them.

Specifically, "wrapping" existing applications as Web Services does not change their fundamental architecture. Accordingly, such an approach will not make the application systems underlying the exposed components any more reusable, nor will it make them any more capable of managing interactions with new applications that are going to consume their services. The increasing re-use of existing components resulting from such partial solutions, primarily via new use cases, typically falls outside the boundary conditions for which the applications containing them were designed and optimized. Such "unintended" re-use increasingly compromises performance and quality of service in applications comprising the re-used components. Moreover, the more diversified and extensive the re-use, the larger the cost and effort of maintaining the desired level of service in the applications comprising the re-used components. Similarly, diverse and extensive component re-use increases the range of risks caused by the accumulated impact of new component interactions on systems that consume the services provided by the re-used components. This results significantly from the fact that the consuming application as no effective control over the operation of the re-used components within the original applications. Moreover, while new software-based system initiatives should have minimal impact on existing operations, they should also foresee the need for eventual integration of their own components into subsequently developed, as of yet undefined applications.

Thus the problems raised by increasing software component reuse have been insufficiently addressed by previous approaches. This is true both from the point of view of (a) existing applications including the components whose services are to consumed, and (b) new or "composite" applications being developed that consume the services of such reused components. To the extent that insufficient approaches encourage component reuse without providing a full solution to the problems raised thereby, they exacerbate significant problems they do not address.

There is accordingly a need for a new approach to designing, developing and maintaining cohesive, high-performance composite applications. Applications may be considered "composite" applications when they provide new or changed functionality involving interaction between software components that were not originally designed to work together, such as existing components provided by different software applications, new components consuming services from different software applications, or new components enhancing functionality or enabling new use cases in existing applications. Previous systems lack an appropriate application model for composite applications, and also lack a practical dynamic integration technique that limits the high costs associated with the combinatorial impact of changes.

While all applications would benefit from use of an application model, and from a technique for limiting the costs associated with the combinatorial impact of making dynamic changes, the needs are even greater in the area of composite applications, because of the increased likelihood of changes in the composite application environment. This is true not only for any given current generation of composite applications, but also for future generations of composite applications that may be anticipated. Accordingly, the need to provide reliable, sustainable changes is amplified in the area of composite applications because changes are more likely than in non-composite application environments.

With regard to the lack of an application model for composite applications, existing application models have either been rigid, as in the area of form processing, or limited in scope, as in page-based Web browsing. Contemporary software applications often lack any application model at all, and it is therefore impossible to ensure that they provide a sustainable business advantage as their functionality changes. In sum, existing application models fail to anticipate the basic needs of composite applications.

With regard to the combinatorial impact of changes, it should be reflected in contemporary methods for producing software applications. Clearly, object-oriented software development technologies have become the preferred tools for most software engineering. Accordingly, components within an application are generally implemented as objects, each associated with corresponding object-oriented "class". In particular, the mechanism of Inheritance in object-oriented software is limited, in that Inheritance relationships are pre-defined at compile time or link time by their classes. All components in a given Inheritance graph have to be compiled together into a single binary module, and a change to any component for use in a composite application may require re-compiling, possibly re-linking, and re-deploying of a new binary module. Accordingly, even singular or relatively small changes can significantly impact software system deployment. In addition, since Inheritance is tightly-coupled to a given set of components, a change in any given component may impact all the heirs of that component's class, with the result that a large number of potential side-effects on other components may need to be carefully evaluated and tested.

Dynamic modifications to applications have been attempted in previous systems by changing class definitions of one or more application components. However, significant shortcomings have arisen relating to the fact that Inheritance is a class property, rather than an object property. Accordingly, systems for modifying software applications have been further limited by the bounding of the late-binding of component objects to the Inheritance graphs of their classes, for example as defined at compile time. As shown in FIG. 1, an Inheritance relationship 10 between $Class_1$ and $Class_2$ for an application component is present at Application Design-Time 12, when the Object Definitions 16a are provided, while at Application Run Time 18 the Compiled Component 14 following compilation 15 instantiates Application Runtime Objects 16 resulting in Application Objects $O_{1a}$ and $O_{2a}$. As shown in FIG. 2, a desired change 20 in an application as it exists at a time T1, and detected at Application Run-Time 18, may need to be made through a application design time change 22 at time T2, and result in re-compiling 24, followed by re-deployment of the new version of the Compiled Component 26, and possibly updating the Application Runtime Objects 16 through the new Object Definitions 17a resulting in Application Runtime Objects $O_{1b}$ and $O_{2b}$ in the new Application Runtime Objects 17b.

FIGS. 3 and 4 illustrate the deleterious effects of the fact that Inheritance in existing systems is tightly-coupled to a development time class hierarchy. This is especially relevant to previous "leave and layer" approaches to software component re-use, which may requisite changes to facilitate component reuse that ripple through the entire development time class hierarchy. As shown in FIG. 3, a change to Class $C_{19}$ 31 in the Class hierarchy 32 is made at Application Development Time 30 in order to change the associated Component 36 in the Application 38 after compilation 34. As a result, at Application Run-Time 39, within the Application Data 42 used at Application Run-Time 39, there are associated changed Data Objects 40. In FIG. 4, at Application Development Time 64, a change to the Class $C_2$ 50 results in changes to its heir Classes 52. After compilation 58, the Application 56 includes modified Components 54, which result in the modified Data Objects 60 with respect to the Application Data 62 at Run-Time 66. Thus the principle of Inheritance can thus explode the total number of changes needed to provide a significant change at a high level within a class hierarchy of an application that includes components to be re-used within a composite program, and/or of a composite application itself.

In conclusion, a new system and method are needed for providing composite applications should include an application model that facilitates integration of re-used application components into composite applications, and anticipate the integration and re-use of the composite applications themselves into subsequent composite applications. Since such a model would motivate increased application integration and component re-use, the new system should also constrain costs associated with the combinatorial effects associated with changes needed to handle new and evolving use cases. Overall, the system should provide information technology systems with the capacity to adapt to changes at a rate comparable to the increasing operational speeds and change rates in the businesses they support.

SUMMARY OF THE INVENTION

In order to address the above described and other deficiencies of the prior art, a new system and method for providing composite applications are disclosed. The composite applications facilitated by the disclosed system include new or changed functionality provided by software components that were not originally designed to work together. The disclosed system includes an application model providing general-purpose invariants that bound the execution of all composite applications regardless of their specific functionality. The disclosed application model enables predictable transactional interactions between components across application boundaries, and a repeatable, sustainable way to reuse and compose new and revised functionality while maintaining their system-level properties intact. In this way, the disclosed application model provides composition as a defining property of compliant applications. The disclosed application model facilitates software component reuse and integration both from the point of view of systems having components whose services are consumed in newly developed composite applications, and from that of the newly developed composite applications themselves, which may subsequently be integrated into other composite applications.

Through the disclosed application model, all components in a composite application are objects having pre-defined, built-in behavior. Each object is either an active object, referred to for purposes of explanation as a "Player", or a reactive object, referred to for purposes of explanation as an "Infogram". An active object can activate services, encapsulates all its inputs and outputs within a bounded space, and is associated with a corresponding application user. A reactive object is instantiated or processed by a service, and belongs to a specific active object at any given point in time. Services can route reactive objects to active objects, which assume ownership or the reactive objects upon their receipt. Component objects in the composite application are instantiated from this built-in 'fabric', and processed using the same execution rules.

The disclosed active objects represent a canonical, user-driven basis for a composite application. In contrast to previous approaches using arbitrary sets of components defined by inward-focused mechanisms that must change and overlap over time, the disclosed application model has a clear, outward-focused anchor: the application users. This anticipates that while functionality made available will change, and related data will evolve, their usage will always be attributed to a given user.

In a composite application environment, it is most critical to effectively address needs relating to component interactions, since components used in a composite application were not designed to work together. There is accordingly almost always a problem to be solved in providing transactional integrity and run-time security using such components within the composite application. In the disclosed application model, this is addressed through definition of a service invocation model applied through a service invocation chain through which users interact with the composite applications, and by providing that each object operates in its own predefined run-time execution space having clear boundary conditions (the "Player Sandbox"). Users issue service requests that are received by an underlying system engine that authenticates a user upon receipt of a first service request. If the requesting user is successfully authenticated, the system engine performs either instantiates a Player object for the user if this is the first request by the user, or re-activates an existing Player for the user from its persistently stored image.

The disclosed application model allows predictable and managed execution of all components integrated within a composite application, irrespective of specific functional differences. The application model allows definition of specific application behavior, while providing a general-purpose invariant. Based on this predictable system level invariance, an underlying system-engine can accordingly assume sole responsibility for managing all of the composite applications' system-level properties. This allows for sustainable and improved system-level properties such as performance, scalability, reliability, high-availability, run-time security and confidentiality in the composite application. The disclosed application model advantageously recognizes that components within a composite application may be re-used at any point in time, and enables the provision of different applications using such components simply by introduction of new context data.

The disclosed application model both facilitates the integration of re-used application components into composite applications, and also anticipates the integration and re-use of composite applications into subsequent systems. Since the ease with which applications may be integrated and components re-used in composite applications is therefore increased, the need to address the potentially combinatorial effects of modifications to such integrated components is amplified. To address this need, a system for run-time object typing for persistently stored objects is also disclosed, that is independent of class typing systems defined at compile-time or link-time. The run-time object typing system persistently stores the type of each object when the object is stored or updated in persistent storage, so that such type information may be made accessible to any component or application within a composite application. Moreover, any component or application within a composite application can load the persistently stored objects to memory and process their methods and properties. A special-purpose software construct (referred to as an "Associator") enables the mapping of run-time object types to program code that implements them. The disclosed system defines Associators as (i) A MapTable Associator containing pairs of object types and classes; and (ii) a Lookup Associator containing a sequence of MapTable Associators. System architects, software designers, or other practitioners such as system analysts, can implement any number of Associators of either type. The disclosed system maintains in persistent storage a registry of all Associators and enables provisioned users to update this registry at any point in time. The disclosed system may further include a runtime environment providing each instance of a provisioned application with a single runtime object (referred to as "Root Associator") assigned with the responsibility for identifying and retrieving the program code that should be activated for handling object requests per each given object type.

Application of the disclosed technique for run-time object typing for persistently stored objects to the disclosed application model provides a powerful compound effect within a composite application. First, different implementations of objects having the same type may be used within any single composite application depending on a current context. This allows different object type implementations to conveniently be associated with different contexts as needed for use within either an original application or within a new application. Second, different object implementations of a common object type may be associated with different composite applications. Third, different implementations of an object type may be conveniently stored in and accessible from a persistent storage system shared by multiple composite applications, such as an original application and the new application to which it contributes. Finally, when staging the development and/or deployment of a newly composite application, the disclosed system provides a sustainable method for changing of a limited set of objects at one time, testing and debugging the resulting modified system, and then incrementally making more changes in a controlled, incremental fashion.

Using the above described techniques, each composite application can be used as an "executable application template", in the sense that it can be reused as-is, and/or further extended, non-obtrusively, either by new code in the same application or by other applications. The inherent reusability and extensibility provided by the disclosed system solves problems unaddressed by previous "wrapping" techniques, and can, for example, enable a new approach to "leave and layer" software integration that is both sustainable and effective.

The application of software to automation and facilitation of business processes was bound for many years to discrete and stable functional requirements, whether operating a specific business function by internal workers within corporate facilities, or allowing customers to submit discrete business transactions over the web. Contemporary software applications are currently engineered using systems and methods that are appropriate for such operational considerations. However, today's evolving business environment is neither discrete nor statically bounded. The availability of information technology is an integral assumption of every aspect of doing business, and software applications are expected to support an ever growing number of business functions, including their complex inter-relationships, that continue to evolve on an on-going basis. Moreover, ubiquitous connectivity enables new integrated business processes that extend beyond organizational boundaries or corporate boundaries, requiring the facilitation and automation of dynamic interactions and complex use cases, across time and space, and in an interactive and timely manner. Clearly, the working assumptions of contemporary software applications are no longer valid in this high-velocity environment, and their inadequacy is increasing operational cost and hurting quality of service at the time software performance is increasingly more critical to business operations. The present invention addresses this growing problem in a change-driven environment by providing a system and method for developing, deploying and maintaining composite applications.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 5:
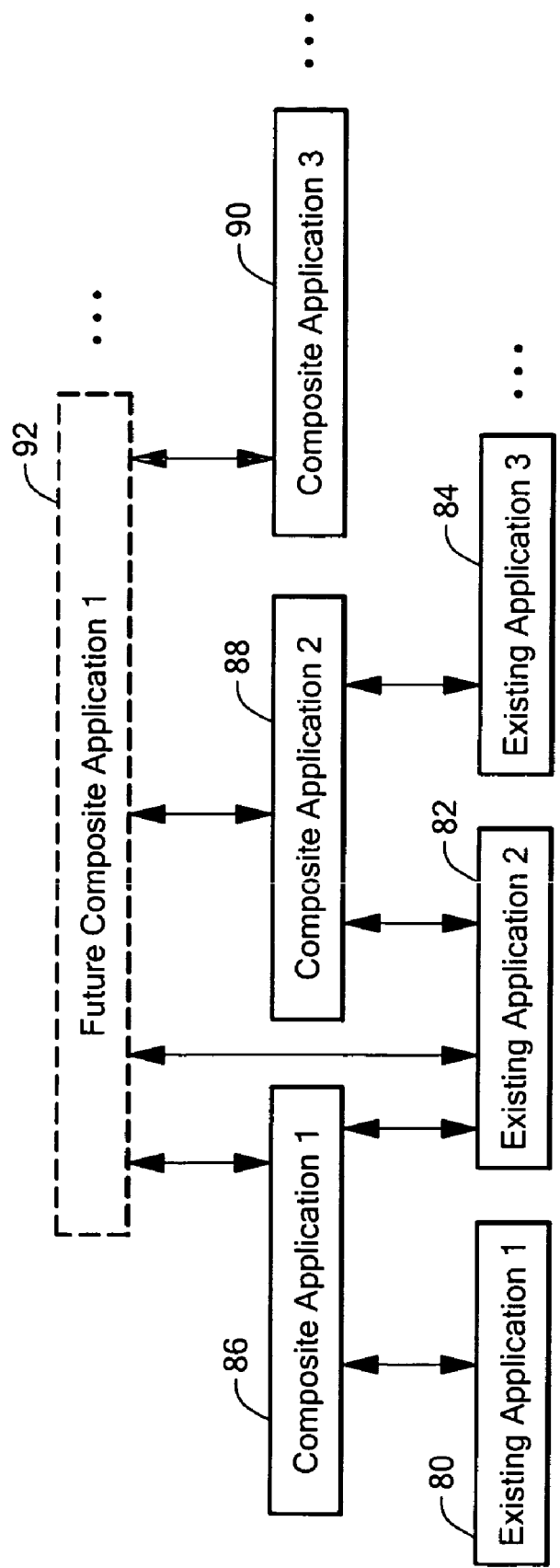
FIG. 5 shows composite applications provided using an embodiment of the disclosed system.

FIG. 5 shows an example of a software-based system environment as may be effectively enabled by the disclosed system. As shown in FIG. 5, through an embodiment of the disclosed system, a number of existing applications, shown for purposes of illustration as including Existing Application 1 80, Existing Application 2 82 and Existing Application 3 84, provide services to a number of composite applications, shown for purposes of illustration, as including Composite Application 1 86, Composite Application 2 88, and Composite Application 3 90. Similarly, through an embodiment of the disclosed system, both the existing applications and the composite applications may be used by some number of future composite applications, shown for purposes of illustration as including Future Composite Application 1 92. One or more of software components through which services are provided by the existing applications to the composite applications, and potentially to future composite applications, were not originally designed to interact with the software components of the composite applications that use them.

Application Model for Composite Applications

Figure 6:
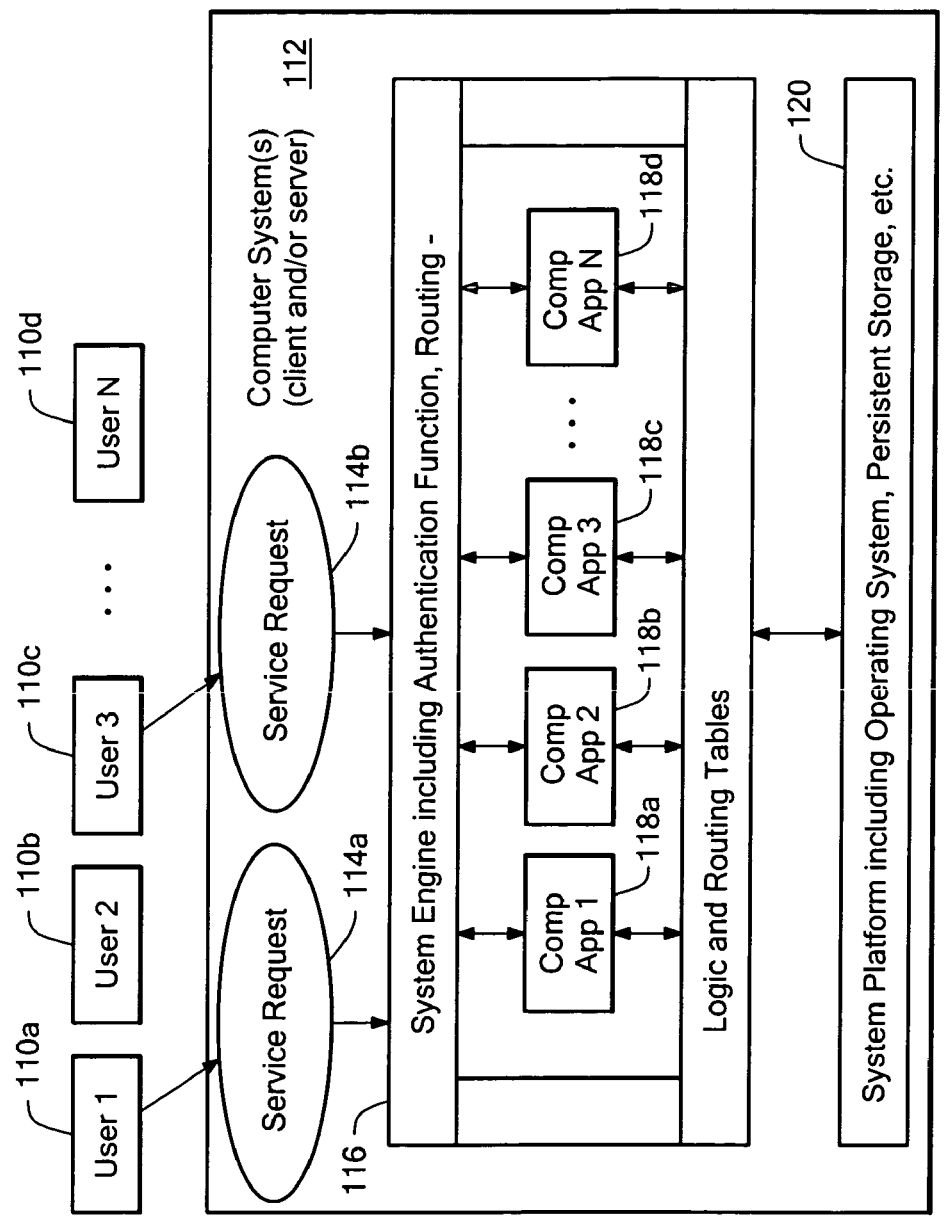
FIG. 6 shows an example of a system including a number of composite applications conformant with the disclosed application model executing in an illustrative execution environment.

As shown in FIG. 6, in illustrative embodiment of the disclosed system operates in an composite application execution environment including a number of users, shown as User 1 110*a*, User 2 110*b*, User 3 110*c* through User N 110*d*, interfaced to one or more computer systems 112, which may include client computer and/or server computer systems. The users shown in FIG. 6 issue service requests, shown as service request 114*a* and service request 114*b*, that are received by the system engine 116.

The system engine 116 may consist of one or more software programs, and is communicably coupled to a number of composite software applications conformant with the disclosed application model for composite applications, shown for purposes of illustration as Comp App 1 118*a*, Comp App 2 118*b*, Comp App 3 118*c* through Comp App N 118*d*. The system engine 116 includes an authentication function, routing logic, routing tables, and other functionalities. The system engine 116 is further communicably coupled to the system platform 120, which includes an operating system for controlling and interfacing to various resources in the computer system(s) 112, including persistent program storage. The persistent storage may be provided using any appropriate device, including one or more direct access storage devices, such as magnetic disks. The computer system(s) 112 may, for example, further include one or more processors coupled to volatile program storage memory, together with various other input/output (I/O) devices and/or communication interfaces.

Each of the users shown in FIG. 6 may, for example, consist of any uniquely identified entity that interacts with the conformant composite applications. A user may be a named individual, but other times a user may consist of an automated utility activating services on behalf of a specific user. During operation of the embodiment shown in FIG. 6, the users issue service requests 114*a* and 114*b* that initially arrive at the system engine 116. The system engine 116 then authenticates the service requests, and establishes object instances, allocates execution space and routing table information as needed to handle the received requests for each of the conformant composite application programs, and handles storage of objects in persistent storage, as further described below. The system engine 116 further operates to hide the details of the system platform 120 from the conformant composite applications. Each of the conformant composite applications shown in FIG. 6 consist of program objects that are either active or reactive program objects, also as further described below.

While reference is made above to one or more computer systems 112, which may include client computer and/or server computer systems, those skilled in the art will recognize that the disclosed system may be embodied in an execution environment in which a load balancer is used to distribute service requests across service processing resources resident on multiple computer systems. Such load balancing may be accomplished in a variety of specific ways, for example using any specific configuration of a loosely coupled set of distributed servers, or a tightly coupled cluster of server systems. Moreover, such a load balancing configuration may be used to distribute service requests sent to a DNS (Domain Name Service) address associated with an Internet domain name. Thus the disclosed system may be embodied in an execution environment including a single logical server that is physically distributed across a set of independent machines.

Figure 7:
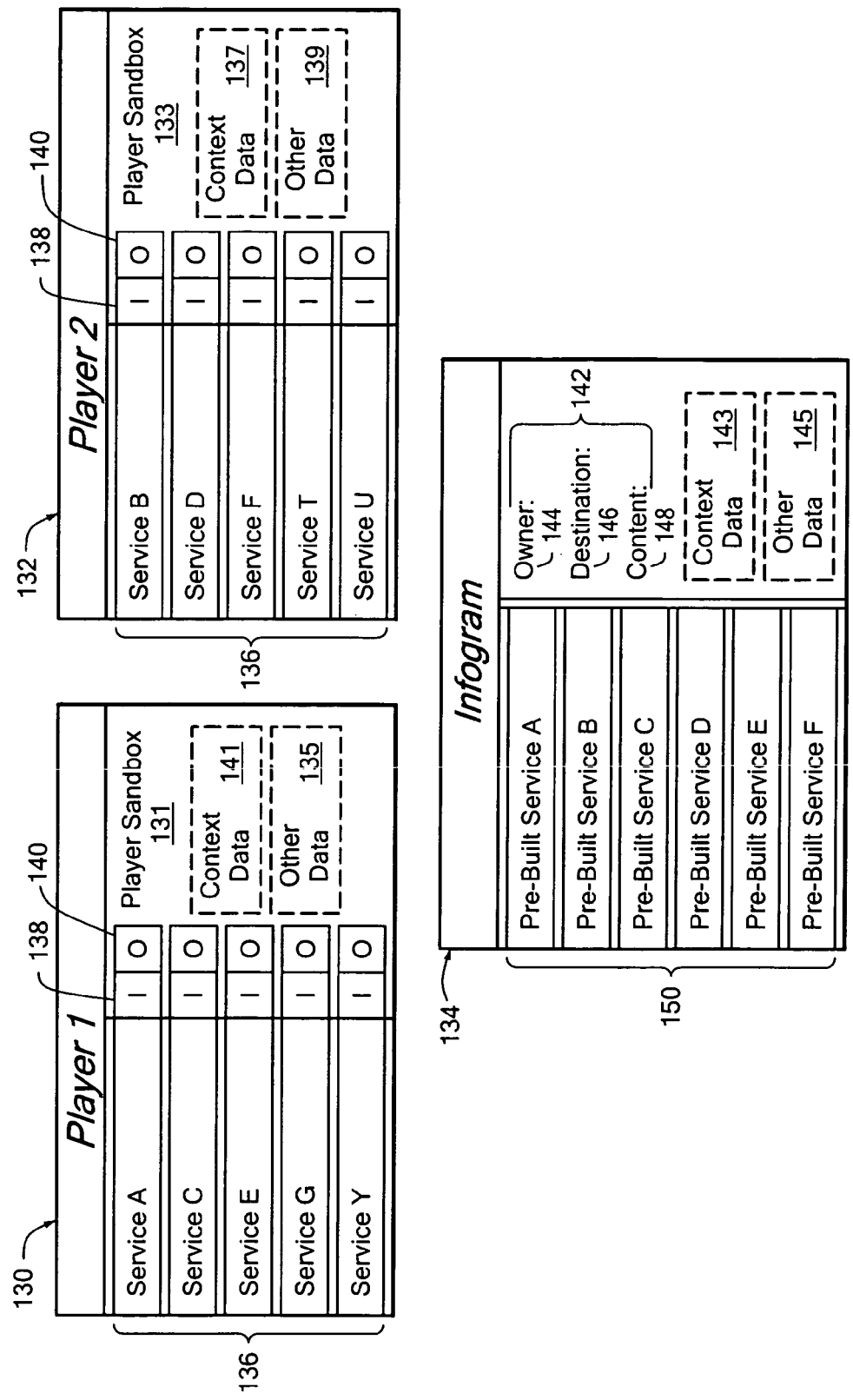
FIG. 7 shows an illustrative embodiment of the disclosed active and reactive program components of composite applications.

FIG. 7 shows an illustrative embodiment of the disclosed active and reactive program objects of the disclosed application model for composite applications. FIG. 7 shows examples of active program objects referred to as Player 1 130 and Player 2 132, as well as an example of a reactive program object referred to as Infogram 134. The program objects 130, 132 and 134 of FIG. 7 are examples of specific types of software program "objects", and may be generated using various types of object-oriented programming languages such as C++, Java, or C-Sharp, and a variety of run time environments such as Java Virtual Machine or Microsoft.Net Framework. Similarly, such "objects" may be generated by any specific non-object-oriented language having a runtime environment that supports dynamic allocation of memory or enables dynamic loading of static code. An object-oriented programming environment used to support the disclosed system may support the object-oriented techniques of encapsulation, inheritance and polymorphism. Encapsulation in this context refers to creation of program "objects" for containing data and associated methods or functions to manipulate the data, where the objects are based on predefined data types sometimes referred to as "classes." An instance of one of the disclosed, predefined classes may simply be referred to as an "object." As is conventional, inheritance in this context allows definitions in one class to be passed down to another class through a class hierarchy. Polymorphism also conventionally allows procedures for an object to be created, without the specific object type of the object being known until run time.

In the disclosed system, each of the active objects, shown for purposes of illustration as player 1 130 and player 2 132 in FIG. 7, is associated with a single, corresponding, uniquely identified user entity that interacts with the application containing the active object. As noted above, these users are usually named individuals, but may also be automated utilities activating services on behalf of a specific individual. Each active object is instantiated using a predefined data type that defines any meta-data the composite application associates with the active object, as well as a set of services provisioned for it. The active object is a named, persistent object encapsulating all of the associated user's interactions with the composite application. An active object is operable to encapsulate both its methods, which correspond to application services that may be requested and used by the object's associated user, and data relating to uses of those application services by the object's associated user.

The active objects 130 and 132 in FIG. 7 are each shown including a number of services 136. Each service of an active object embodies a single interaction of the user associated with the active object with the application, for example resulting in what the application sees as a single business transaction. In one embodiment, following what is referred to as the Service-Oriented-Architecture (SOA) design approach, each of the services 136 provides formal interfaces for its inputs shown in column 138 and its outputs shown in column 140.

Each active object in the disclosed system activates its services and manages its data. The data for each active object may, for example, include data provided as inputs and outputs for services by the associated user, data that is expected to be available across services, personal data identifying the associated user irrespective of specific service, and/or other data.

Advantageously, active objects in the disclosed system are persistent, in that they are stored in non-volatile storage of some type based on a predetermined periodic schedule and/or one or more trigger events. The storing of active objects in persistent storage may, for example, be performed by the system engine 116 shown in FIG. 7. In this way, the active objects of the disclosed system provide durable application state and context across multiple service invocations, user sessions and application runs.

Active objects are responsible for defining their own application data and registering their application services using any appropriate type of service registry so that they can be located and accessed. Application programs are responsible for registering their active objects and defining the access rights of the active objects, for example based on access authorizations of the users associated with those active objects. The underlying system engine supporting the applications, such as the system engine 116 of FIG. 7, is responsible for provisioning active objects and managing their persistent storage images. As a result of the disclosed system engine and application model, the disclosed active objects may be high-level, application programming constructs, rather than including system-level or platform specific programming, since the applications containing them do not have direct access to system platform methods and properties. Such system platform methods and properties are handled through the system engine 116 as shown in FIG. 7.

In the disclosed system, the application model requires that active objects can only change their own state. As active objects transact with each other, the disclosed application model defines another, different object type for maintaining the application's integrity while the data is in transit between active objects. The disclosed system manages data-in-transit among active objects using what are referred to herein as reactive objects, shown for purposes of illustration as the infogram program object 134 in FIG. 7. The disclosed reactive objects were necessitated by the fact that previous messaging technologies are insufficient, since their messages are context-free. Thus, using such previous messaging technologies, the application's overall integrity is conditioned upon both the sender and the receiver absolute coordination across time and space, and their completely aligned interpretation of the message in the very same way.

In order to avoid such problems, the reactive objects of the disclosed system are managed objects encapsulating data-in-transit among the active objects. Instead of sending messages between objects, the disclosed system routes reactive objects between active objects. The disclosed reactive objects are reactive in that they are each instantiated or processed by services of the active objects.

In one embodiment, a system invariant is that each reactive object is always owned by a specific active object at any given point in time. At any given time, a reactive object is only accessible to its owner. Other than the reactive object's owner, other active objects can only determine the reactive object's existence, and find its location or address.

A reactive object's owner is always defined by a persistent link to the active object that owns it. Initially, the owner of a reactive object is defined by a persistent link to the active object that instantiated it. For example, in the case of an order processing application, a reactive object representing the order is instantiated by the active object associated with the customer-user that placed the order.

A service of an active object can route a reactive object to one or more other active objects. In the example where a customer places an order through an order processing application, the reactive object instantiated to represent the order may be routed using a service of the active object corresponding to the customer placing the order, to another active object representing a merchant for the ordered goods.

Like active objects, reactive objects are persistent objects, in that they are copied into persistent storage by the system engine 116 of FIG. 7, based on some predetermined periodic schedule, or as a result of detecting one or more trigger conditions. Also like active objects, reactive objects encapsulate their methods and properties. Persistent properties 142 identify the current owner 144 of a reactive object, which is the sending active object prior to the receiving active object assuming ownership. The persistent properties 142 further identify a current destination active object 146, and the data exchanged using the reactive object, shown as content 148.

The reactive object 134 is shown including methods 150, including pre-built services that define desired "hand-off" events with respect to passing the reactive object 134 between active objects. A reactive object may include pre-built and possibly also dynamically defined services. The pre-built service of a reactive object relate to ownership handoff events and/or routing of the reactive object between active objects. These pre-built services are common to all reactive objects. Other predefined services may be provided for either active or reactive objects, such as shell functions allowing the objects to execute I/O functions through an underlying system engine. Since neither the active or reactive object can directly access platform specific I/O functions, shell functions can be used to associate high level I/O operations with specific system services. This advantageously helps to ensure application invariance across platforms and deployments, regardless of any functional change in the existing or new composite application.

During operation of the disclosed system, the system engine 116 of FIG. 6 is responsible for providing a reliable transaction that transfers one or more reactive objects between active objects. For example, such a transaction may include setting a persistent link in the destination 146 to the receiving active object, and changing the ownership of the reactive object to the destination active object at some predetermined point in the transaction. The transaction is accordingly made durable, in that non-repudiation is guaranteed. Each active object involved in a transaction, including a current owner 144 and the destination 146, can update its own state relative to the change in the state of the reactive object. No reactive object is ever an "orphan", or "transient", or in both places. As a result, the disclosed reactive objects are persistent application objects that are reliably managed across time and space, regardless of the composite application that happens to instantiate or process them at a given point in time.

Each of the active objects shown in FIG. 7 includes its own private execution space, or Player Sandbox. As shown in FIG. 7, the active object 130 includes a private execution space 131 ("Player Sandbox" 131), and the active object 132 includes a private execution space 133 ("Player Sandbox" 133). Each of the private execution spaces of the program objects in the disclosed system are unique over both space and time. The private execution spaces 131 and 133 of the active objects 130 and 132 each include context data and other data, shown as Context Data 141 and Other Data 135 in active object 130, and Context Data 137 and Other Data 139 in the active object 132. The context data of an active object relates to the use of the active object within an associated application or composite application. The context data of an active object may accordingly define the application or composite application within which one or more active objects are being used. Accordingly, a given active object can effectively be used across multiple applications or composite applications simply by changing its context data. The reactive object 134 ("Infogram 134") also is shown including Context Data 143, which may similarly be application or composite application specific, as well as Other Data 145. The reactive object 134 is being executed within the private execution space ("Player Sandbox") of the respective active object that activates its services. The context data of an active object or reactive object may be used as the basis for dynamically determining at run time a correspondence between at least one object type and corresponding object generating program code, as further discussed below.

Figure 8:
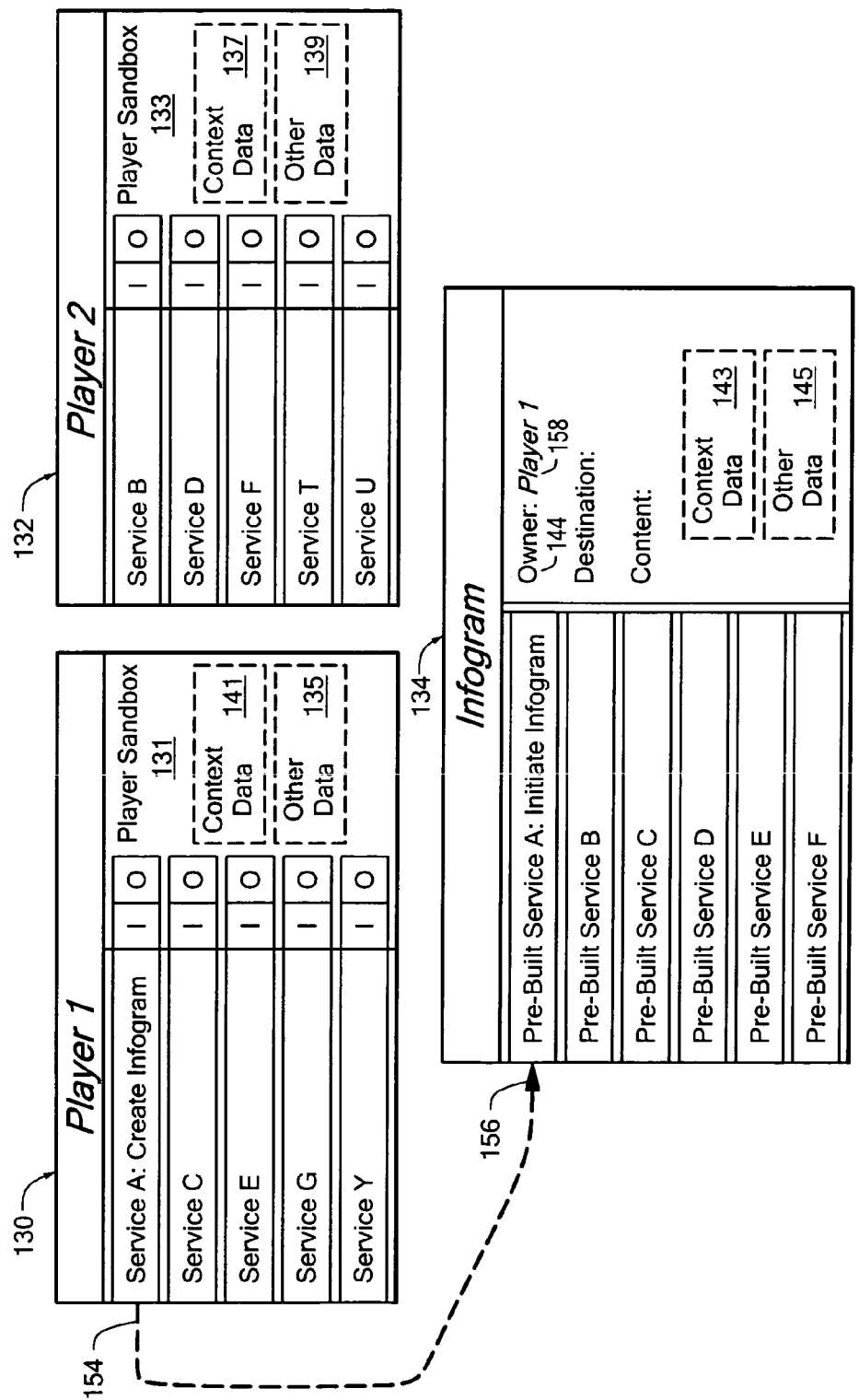
FIG. 8 illustrates creation of a reactive object by an active object in an embodiment of the disclosed system.

FIG. 8 illustrates creation of a reactive object by an active object in an embodiment of the disclosed system. As shown in FIG. 8, the active object 130 invokes a service 154 that creates a reactive object. As a result, the reactive object 156 is instantiated, and a call is made to the pre-built service 156 in the instantiated reactive object 156, which loads the owner data 144 with a link to the active object 130, shown for purposes of illustration as the value "Player 1" 158.

Figure 1:
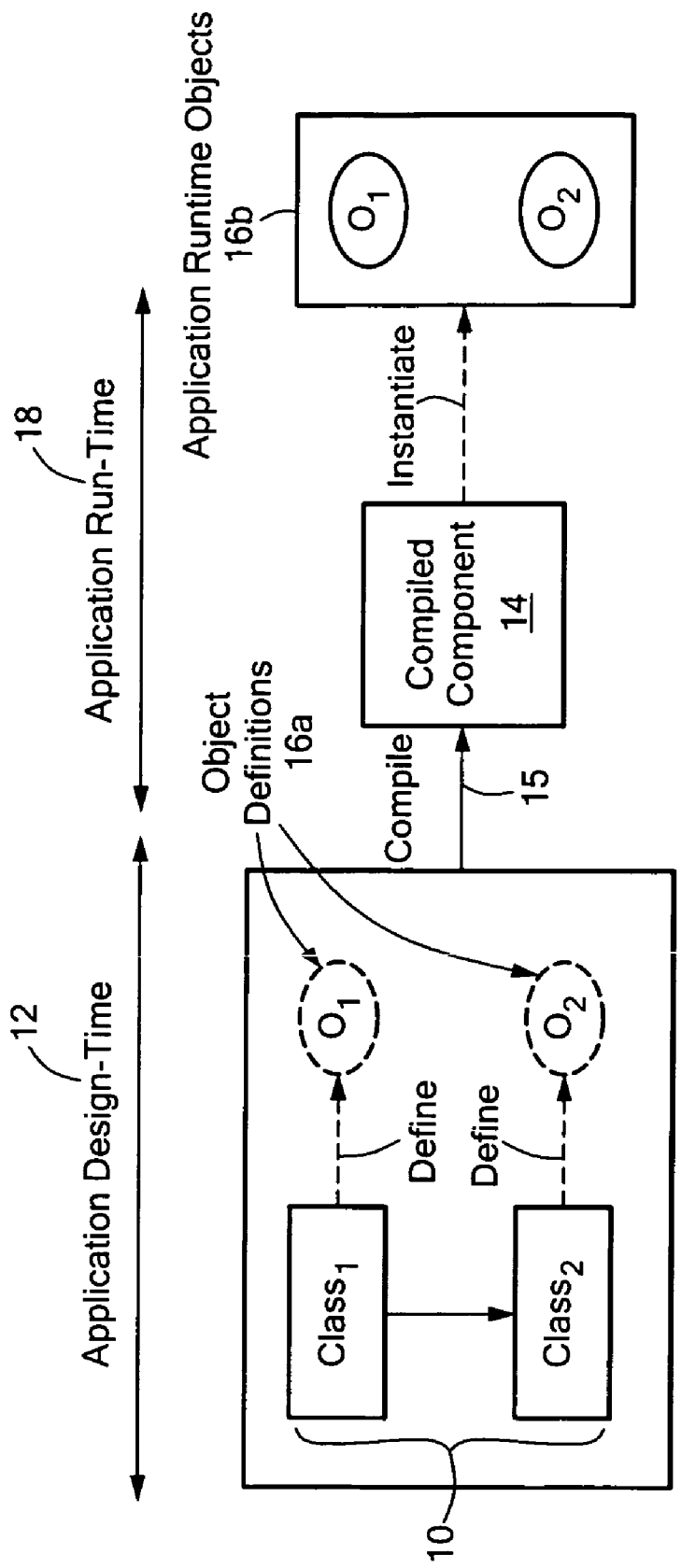
FIG. 1 is a block diagram illustrating inheritance as a design time property.
Figure 2:
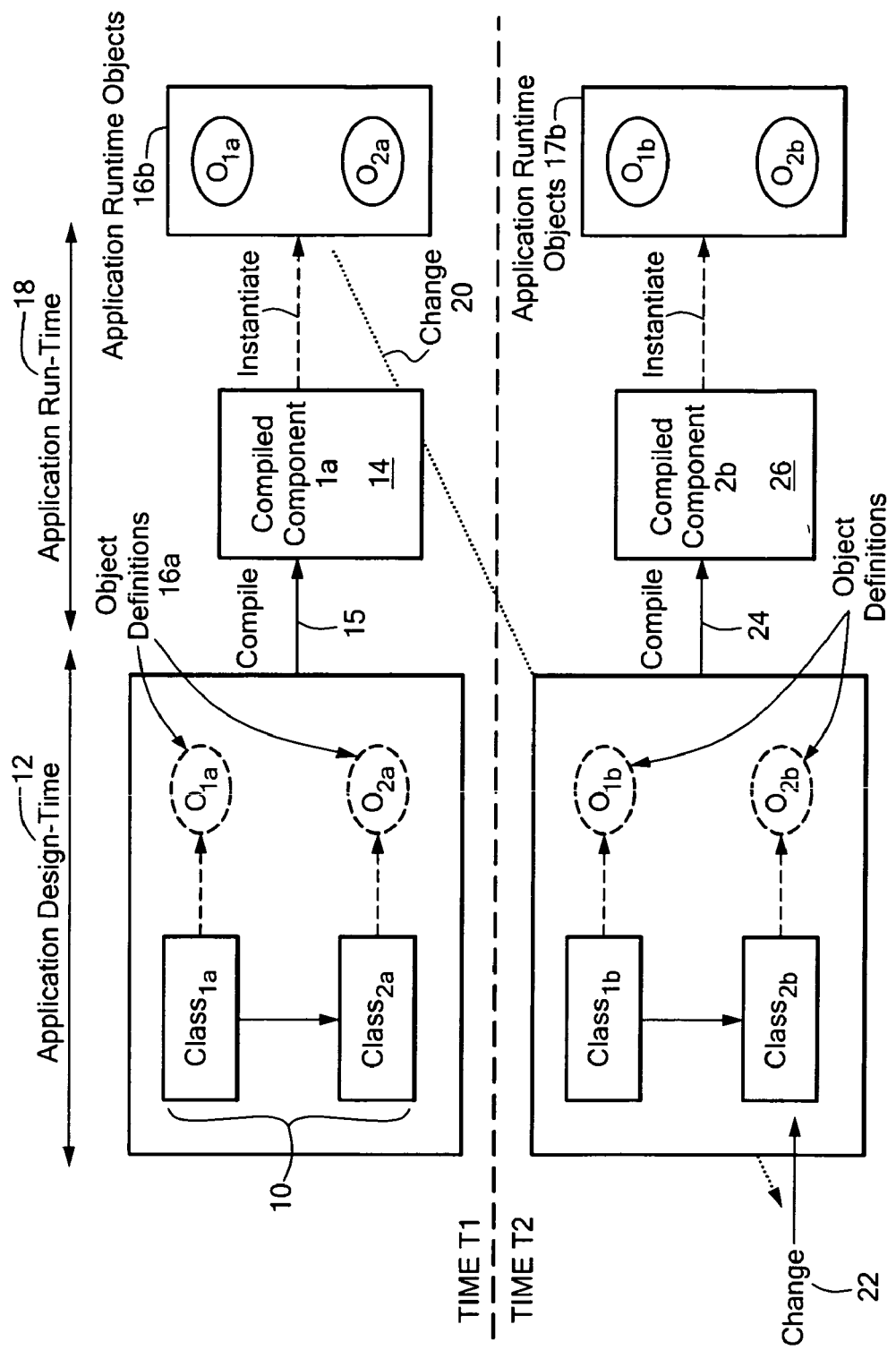
FIG. 2 is a block diagram illustrating how changes result in recompiling and redeploying a whole code module.
Figure 3:
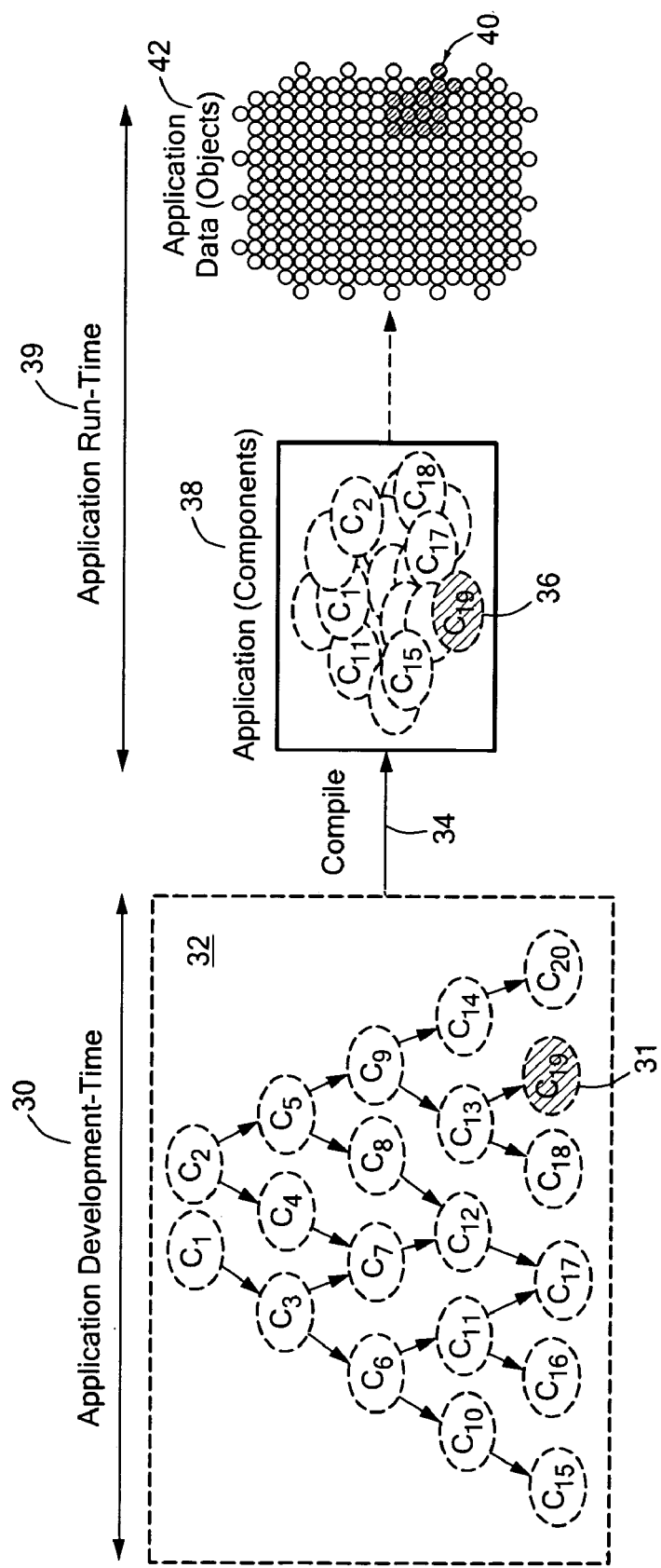
FIG. 3 is a block diagram illustrating how inheritance is tightly coupled to a development time class hierarchy.
Figure 4:
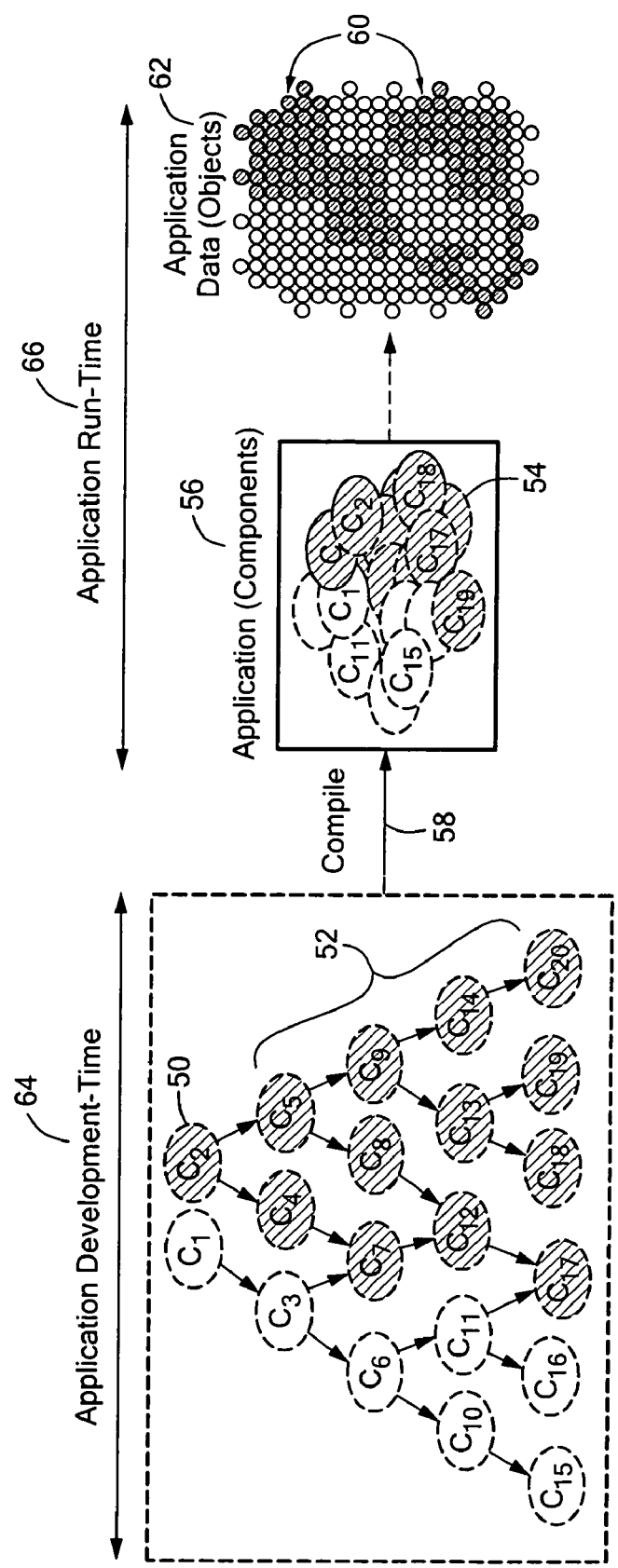
FIG. 4 is a block diagram illustrating how inheritance explodes combinatorial effects of modifications.
Figure 9:
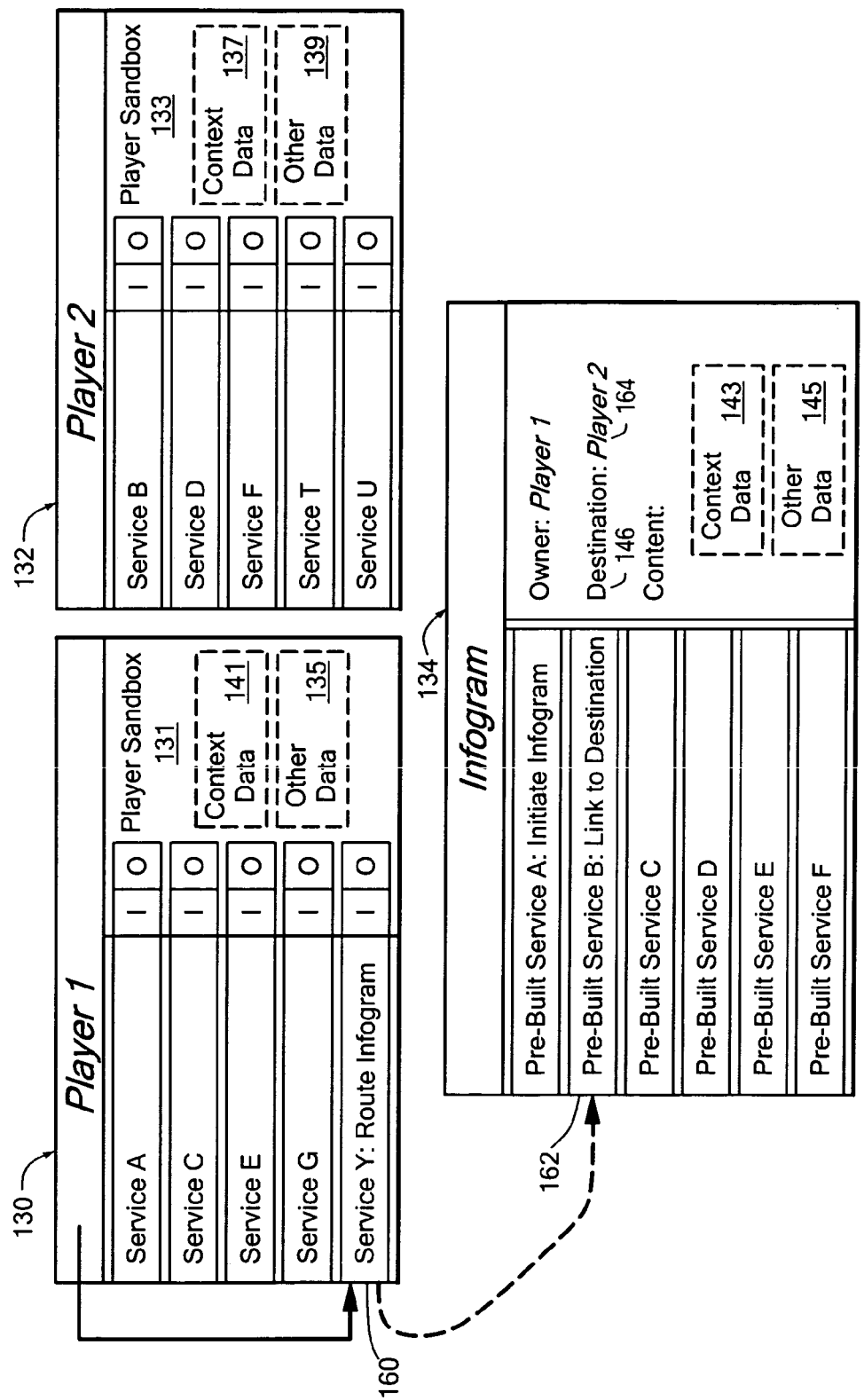
FIG. 9 illustrates routing of a reactive object by an active object to another active object in an embodiment of the disclosed system.

FIG. 9 illustrates the active object 130 causing the reactive object 134 to be routed to the active object 132. As shown in FIG. 4, the active object invokes a service 160 that causes the disclosed system to invoke a pre-built service 162 in the reactive object 134. The service 162 causes the destination data 146 in the reactive object 134 to be loaded with a link to active object 132, shown for purposes of illustration as the value "Player 2" 164.

Figure 10:
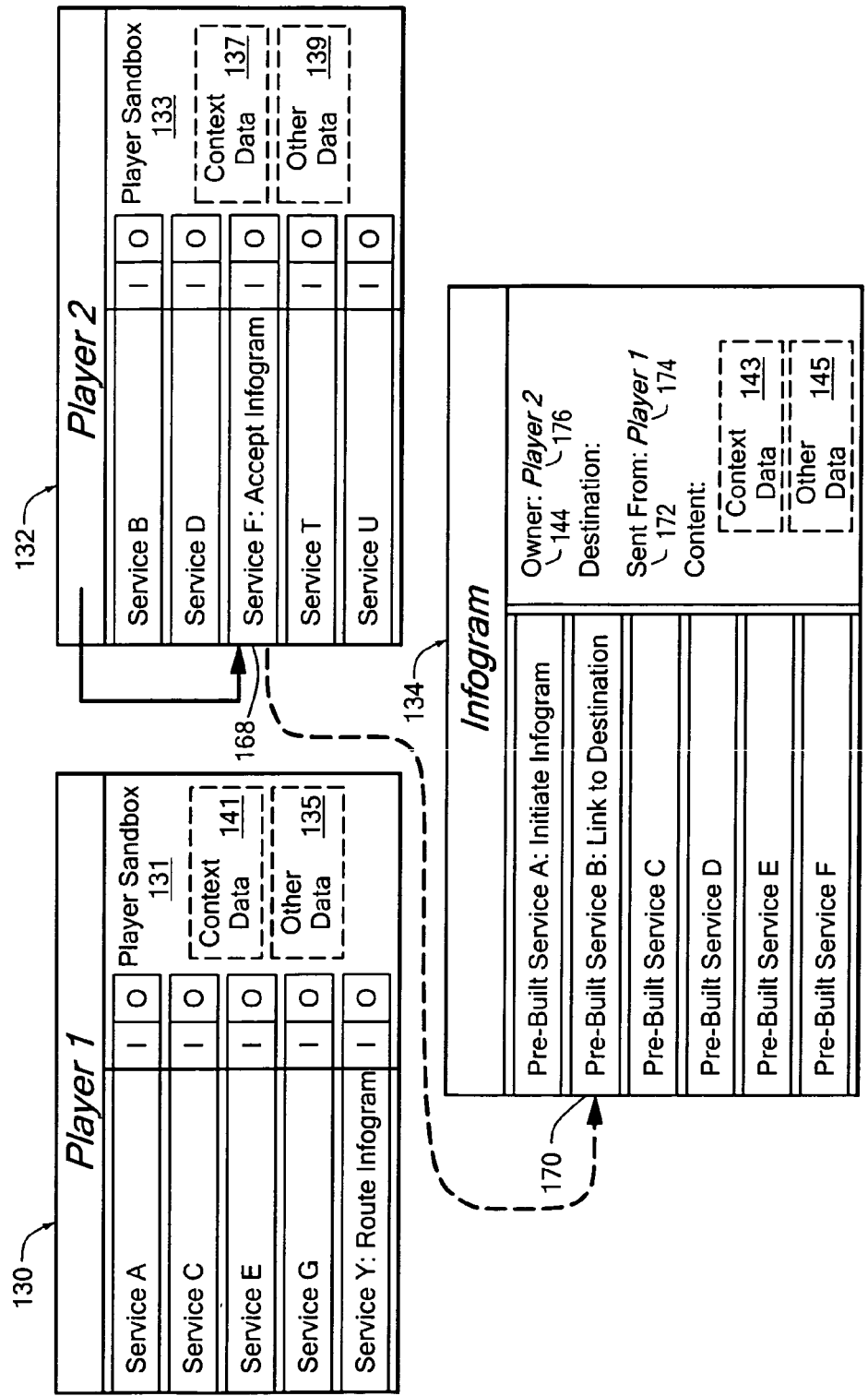
FIG. 10 illustrates transfer of ownership of a reactive object from a sending active object to a receiving active object in an embodiment of the disclosed system.

FIG. 10 illustrates transfer of ownership of the reactive object 134 from the sending active object 130 to the receiving active object 132 in an embodiment of the disclosed system. As shown in FIG. 10, the receiving active object 132 invokes a service 168 that causes the pre-built service 170 in the reactive object 134 to be invoked. The pre-built service 170 causes the ownership data 144 in the reactive object 134 to be loaded with a link to active object 132, shown for purposes of illustration as the value "Player 2" 176. A sent from data object 172 may further be used and/or caused to indicate that the active object 34 was the sender of the reactive object 134, thus preserving a link to the sending active object even after the ownership of the reactive object has been changed to indicate the receiving active object 132. Both the active objects and the reactive objects of the disclosed system are unique over space and time.

As illustrated in FIGS. 8-10, after a reactive object is instantiated, its services can be invoked only by active object services of an active object that currently owns the reactive object. In the illustrative embodiment of FIGS. 8-10, a reactive object is always owned by a single active object. The hand-off of ownership from one active object to another may occur at various specific points in the transfer of the reactive object. For example, the ownership of a reactive object may occur at any one of the following points:

1) When a sending active object determines the identity of the destination active object for the reactive object. For example, this may occur when a user clicks on "Send" when sending an email message. At such a point, the ownership of the reactive object is changed to indicate the receiving active object.

2) When the reactive object arrives at a server computer system associated with the sending active object.

3) When the reactive object arrives at a server computer system associated with the receiving active object.

4) When the reactive object arrives at a client computer system associated with the receiving active object.

5) When client software on a client computer system opens a message, such as an email message, associated with the reactive object.

In the disclosed system, routing of reactive objects between active objects is accordingly accomplished by changing ownership of the reactive objects. If the active objects involved in routing a given reactive object are all provisioned within the same computer system, such as a server system, then the routing of a reactive object may, for example, only involve passing of pointers between the active objects. No copying of the routed reactive object is required in such circumstances. In the case where a reactive object is being passed between active objects located on separate computer systems, the routed reactive object may need to be copied.

Figure 11:
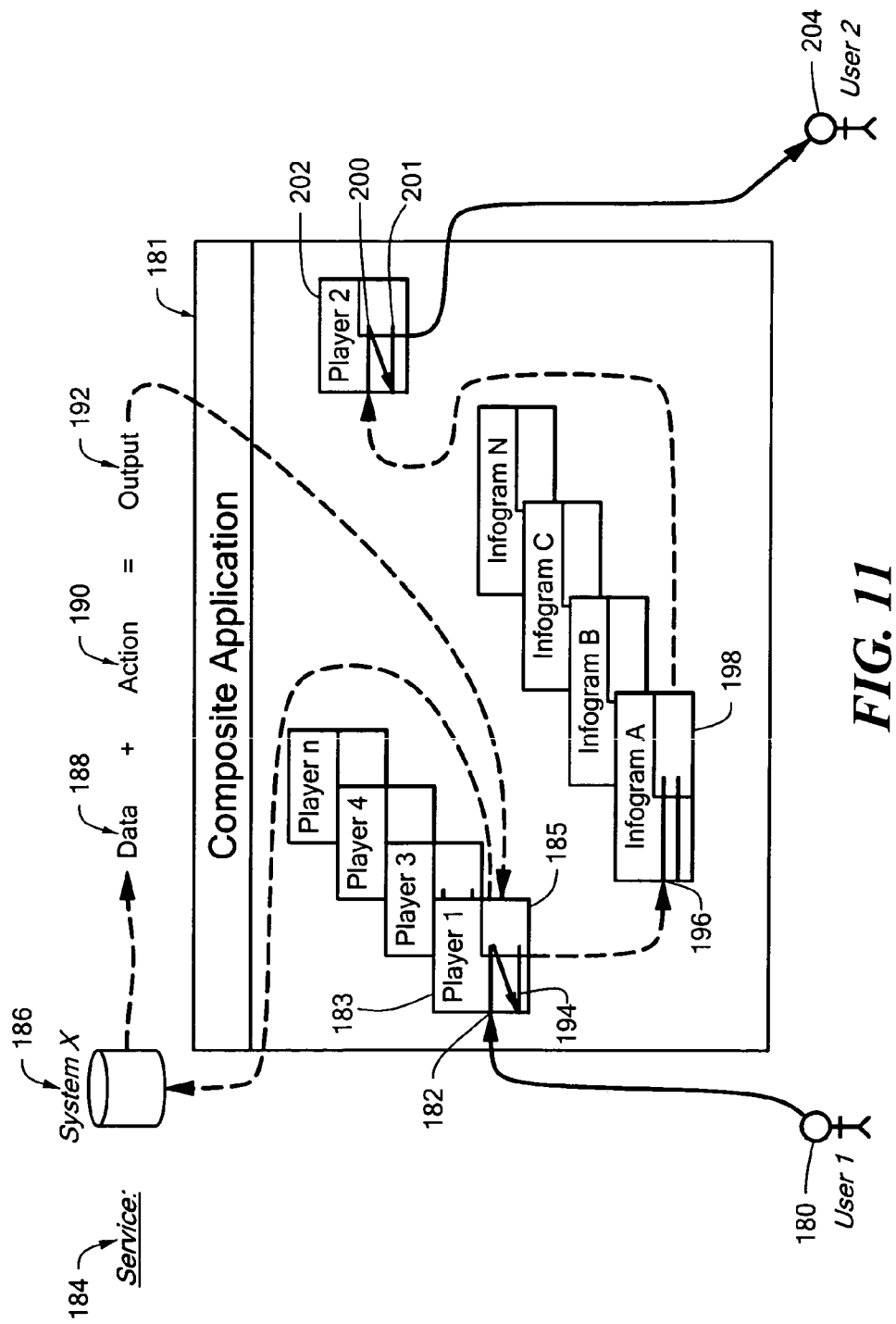
FIG. 11 illustrates operation of an embodiment of the disclosed system to invoke a service through an active object and to send a reactive object with the service results to another active object

FIG. 11 illustrates operation of an embodiment of the disclosed system to invoke a service through an active object, and to send a reactive object with the service results to another active object. As shown in FIG. 11, a user shown as User 1 180 issues a service request that is received by the active object associated with the User 1 180, shown for purposes of illustration as Player 1 183 within the Application 181. A service function 182 is invoked as a result, causing the service 184 to be executed in response to data or functionality provided by system X 186. During execution of the service 184 on the system X 186, data 188 may, for example be provided to the private execution space 185 in the active object 183 from the system X. The action 190 is then performed on the data 88 in order to provide an output 192 that is then passed back to the 185 private execution space of the active object 183. A service 194 of the active object 183 is then invoked to create reactive object 198, which is used to pass the output 192 from the active object 183 to the active object 202. The active object then invokes a service 200 to receive the reactive object 198, and invokes another service 201 to display or otherwise present the output 192 to the receiving user, shown as User 2 204.

For example, User 1 180 and User 2 204 could be associated with different contexts, such that objects are generated in a context specific manner for each of them. Accordingly, Player 1 183 may be generated by object generating code determined in response to context data that is specific to a context associated with User 1 180, and Player 2 202 may be generated by object generating code determined in response to context data specific to a context associated with User 2 204. The context for each of User 1 180 and User 2 202 may be specific a single active ("Player") object, or may be shared across a number of active objects. For example, each player could represent a different level of granularity with regard to a shared context, such as a bank account. In addition, each player active object may operate using different context data, and the different context data used by the active object may be used to determine the execution of a given service through a reactive object invoked by that active object at a certain point in time. The object generating program code for a reactive object may accordingly be determined at least in part based on such active object context data. The context data of an active object may further be hierarchical, networked, or organized in some other way, as appropriate for the Composite Application 181. In sum, and as noted above, each active object has context data stored in its private execution space, and that context may be unique or shared with other active objects, as determined during execution by the Composite Application 181 shown in FIG. 11.

Figure 12:
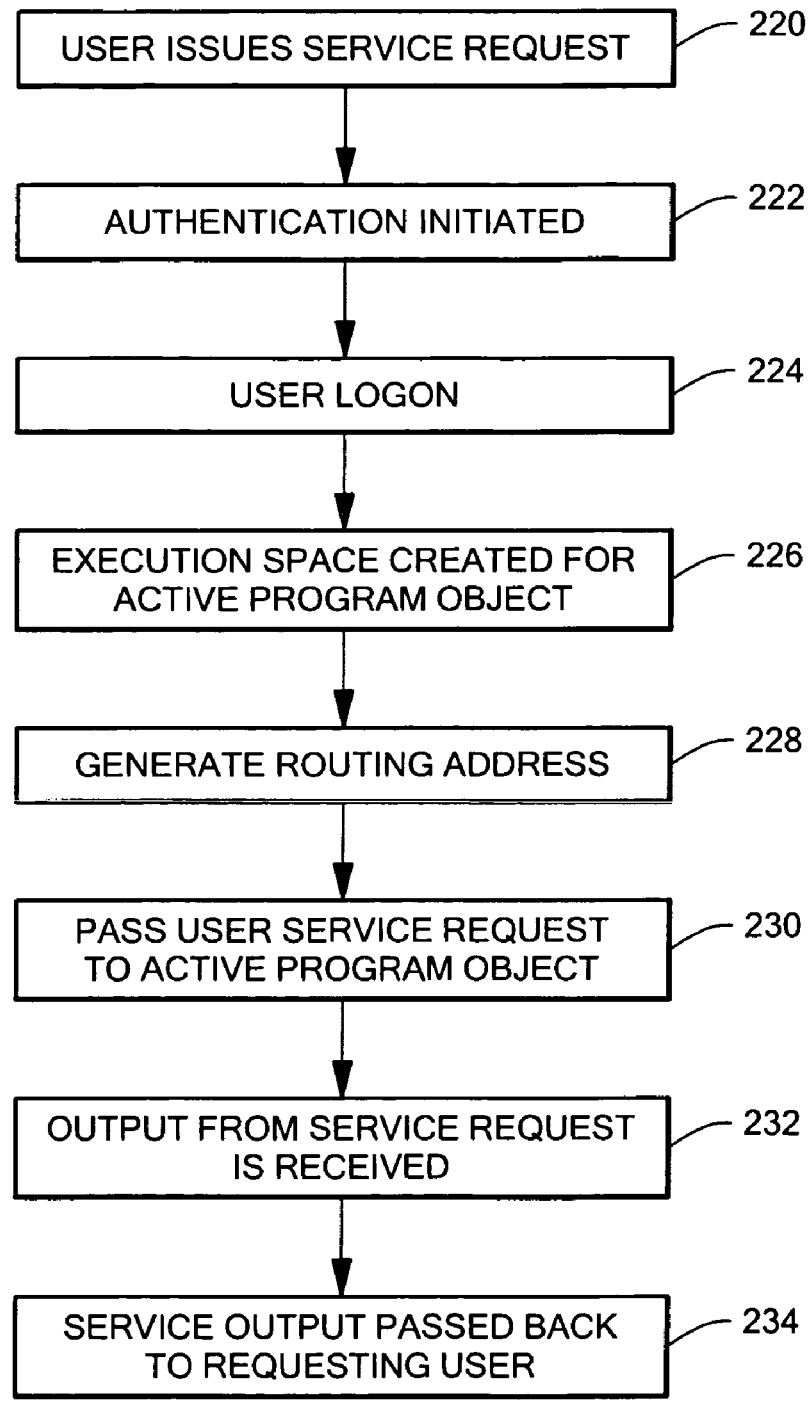
FIG. 12 is a flow chart showing steps performed in an embodiment of the disclosed system to provide a predefined service invocation chain.

FIG. 12 is a flow chart showing steps performed in an embodiment of the disclosed system to provide a predefined service invocation chain in a composite application. At step 220, a user issues a service request that can be processed by an application program conformant with the disclosed application model. Since users cannot execute an application directly, at step 222, the service request is received by an underlying system engine program that supports the application program. If this is the user's first service request, the system engine initiates an authentication process to determine whether the requesting user is authorized to use the requested service. The user may then provide authentication credentials, such as a user name and password at step 224, in order to log in. In the event that the user is authenticated, the underlying system engine either instantiates an active object to be associated with the user, if this is the user's first service invocation, or re-activates the user's associated active object from a persistent storage image of the active object. The object generating program code for instantiating an active object (or a reactive object) may be determined on a context specific basis, based on context data associated with an application or composite application. No interaction with an application or composite application is possible without an identified active object, and accordingly, all further operations by the requesting user are unequivocally attributed to the active object associated with the requesting user.

At step 226, the system engine program allocates a private execution space for the requesting user's associated active object. Then, at step 228, the system engine creates a unique entry in a routing table contained in the system engine, that is associated with the active object. The routing table(s) stored in and managed by the system engine allow reactive objects to be routed by the system engine between uniquely identified active objects.

At step 230, the system engine passes the service request to the active object associated with the requesting user. At step 232, the output from the service request is received by the requesting user's active object, and at step 234 the service output is passed back to the requesting user.

All subsequent service requests by the requesting user are processed using the active object associated with that user, using the private execution space for that active object. When the user logs out, or is idle for a predetermined period and, the system engine may disconnects the user from the application, by deallocating the memory space used by the associated active object, and storing a copy of the active object in persistent (non-volatile) storage. Thus no login credentials are ever passed directly to services, so there is no opportunity to abuse them programmatically. Similarly, since service requests always result in data exchanges using reactive objects, rather than code exchanges, there is no opportunity for non-provisioned code to enter the private execution space of a user's active object. Abuse or misuse are limited in time, given the fact that longevity of executed code is always restricted to a single service invocation, and that provisioning is performed against the respective user's rights. Abuse or misuse are also limited in space, given the fact that services have no visibility beyond the address-space of the private execution space of the active object.

The disclosed application model allows predictable and consistent execution of all conformant applications, irrespective of differences between specific application services, thus allowing the underlying system-engine to assume responsibility for managing applications' system-level properties such as performance, scalability, reliability, availability, runtime security and data confidentiality. This frees application developers from the need to develop, tune and maintain the system-level properties of their applications, and allows them to focus on the developing the application-level functionality; thus, reducing required skills and decreasing the necessary level of effort to develop contemporary composite applications. Furthermore, consistent and predictable operation of all applications conformant with this model allows the underlying system-engine to optimize their operation and increase their quality of service.

As noted above, the disclosed application model both facilitates the integration of re-used application components into composite applications, and also anticipates the integration and re-use of composite applications into subsequent systems. However, the increased ease with which applications may be integrated and components re-used in composite applications is therefore increased increases the need to address the potentially deleterious effects of modifications to such integrated components, and this increased need is addressed in the disclosed system for providing composite applications as described in the dynamic late-binding technique disclosed below.

Figure 13:
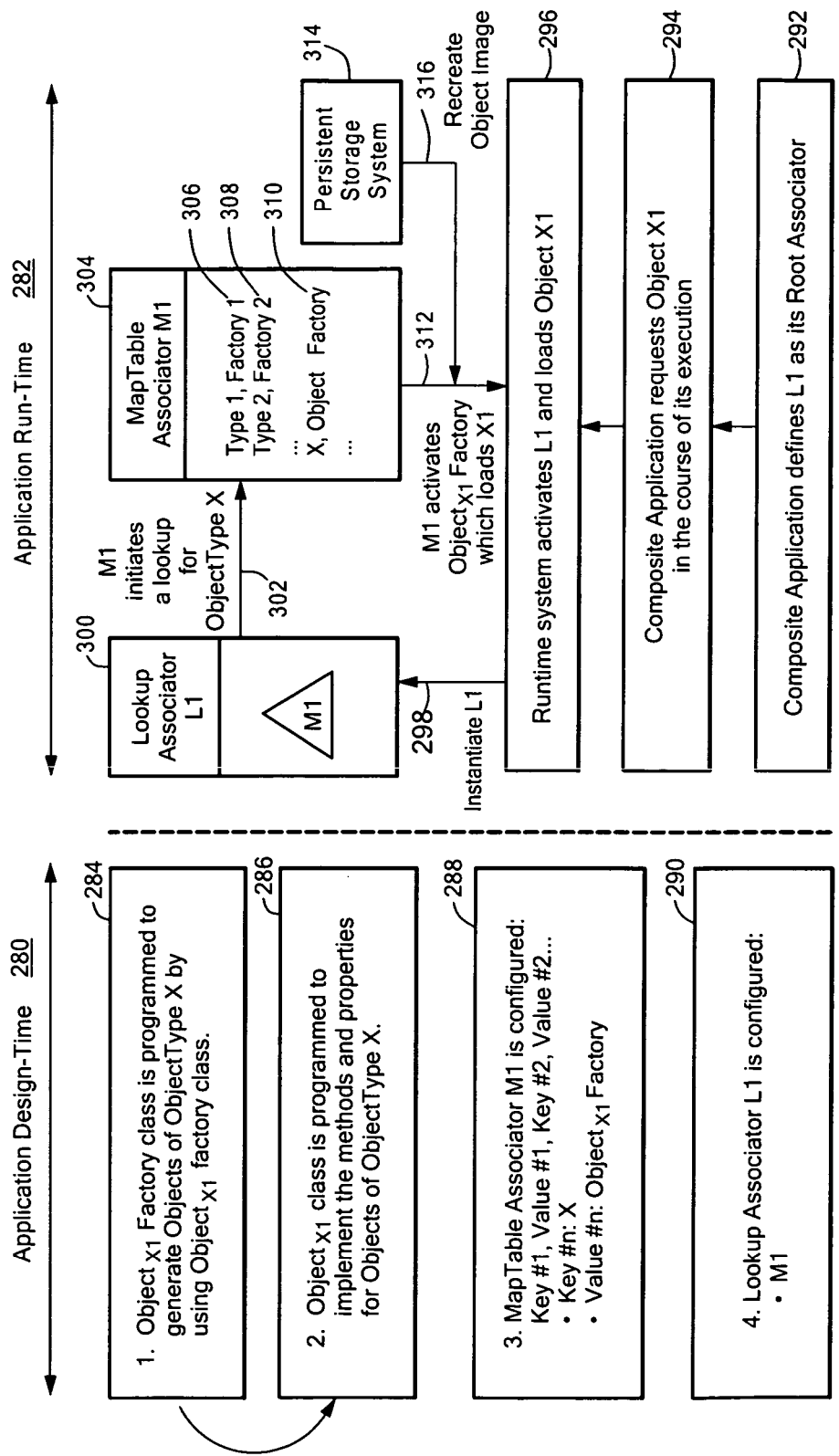
FIG. 13 is a block diagram illustrating an embodiment of the disclosed system.

Dynamic Late-Binding of Persistent Object Implementations for Composite Applications As shown in FIG. 13, an illustrative embodiment is described in terms of actions performed during software Design-Time 280 and software run time 282. Software Design-Time 280 may be considered the time period during which a software-based system, such as a composite application, is designed and/or developed, while software run time 282 may be considered the time period after the resulting software based system has been deployed, and has begun execution. Using this terminology, steps taken to perform "object definition" occur during Design-Time 280. These steps create built-in building blocks that provide architects and developers of software-based systems with the ability to design and develop persistent objects in a way that enables dynamic-late binding.

As further shown in FIG. 13, the run time period 282 involves the use of software objects referred to for purposes of explanation as MapTable Associators, (such as MapTable Associator M1 304), Lookup Associators (such as Lookup Associator L1 300), and Root Associators. The steps and interfaces described with regard to the run time period 382 relate to configuring the disclosed run time binding process, which provides software architects and system administrators with full control and flexible management of the late-binding process. Moreover, the disclosed Root Associators may be used during execution by a runtime environment of an embodiment of the disclosed system to support the late-binding resolution process.

For purposes of concise explanation, in the illustrative embodiment, object definition generally follows a contemporary "factory" approach. Accordingly, each implementation of an Object Type is comprised of two classes: one is an "Object Implementation" class providing the specific methods and properties for object of the defined type, and the other is an "Object Factory" class providing a software source for actually creating objects of the given type. A preferred embodiment maintains both classes in a single source file, and provides a pre-programmed "Abstract Object" that all other objects are inheriting from. In such an embodiment, an "Abstract Object Implementation" is an abstract class providing, among other things, the following methods:

get_object_type—retrieves the object's type get_object_name—retrieves an object's name—for example, a unique identifier within a given type In this preferred embodiment, each specific object's implementation class inherits the above methods, which take care of maintaining each object's type and name in persistent storage, and manage their referential integrity. These methods enable the persistent objects of the disclosed system to be maintained across transactions, user sessions, and application executions, and are identified by unique, typed names. As noted above, the persistent objects may be maintained using the above methods in files, databases or any other type of persistent storage system, and using various media formats provided by contemporary persistent storage systems. Each specific object's implementation class also provides implementation of other specific methods and properties.

Further in the preferred embodiment, an "Abstract Object Factory" is an abstract class providing the fundamental methods that the actual Object Factory will need for creating objects of a given type, either by instantiating them in memory or restoring them from persistent storage, and provides the following methods:

load_object—retrieves an object from memory or re-creates it from persistent storage create_new_object—creates the object's image in persistent storage update_object—updates the object's image in persistent storage remove_object—deletes the object's image from persistent storage The preferred embodiment further includes a customized class loader, which may use industry-standard techniques. As a result, when the factory class is instantiated, its pre-programmed Abstract Object Factory requests from the class loader the class implementing objects, and uses them in implementing the above methods.

A further general description of the "factory" approach to software engineering is found in "Design Patterns" by Erich Gamma, Richard Helm, Ralph Johnson, and John Vlissides. A similar general approach is referred to as the "Abstract Factory Design Pattern" in C++, Java® and Microsoft.Net® technical literature. Those skilled in the art will recognize that the present invention is not limited to using a factory based approach, and that other approaches to object definition and creation may be used consistent with the principles of the invention. Similarly, any specific object oriented programming language may be used to provide the features of the disclosed system, such as, for example, C++, Java® or C#, as well as any specific non object-oriented language having a runtime environment that supports dynamic allocation of memory or enables dynamic loading of static code.

As shown in FIG. 13 and further described below, Associators are software objects that make up the mapping engine that maps object types onto object factories. The preferred embodiment implements Associators as interfaces. For example, the Associators may be implemented as Java interfaces. Other specific mechanisms may be used, such as Interface Protocols used in some object oriented languages. Those skilled in the art will recognize that other embodiments may implement Associators using other software constructs such as abstract classes or data structures. Moreover, any specific kind of software module may be used to implement the disclosed Associators that is operable to input a key and return an indication of a corresponding object generating program. While the definition of each Associator is maintained in persistent storage, they are instantiated by the runtime system as memory objects. The Associators used by the disclosed system are:

1) MapTable Associators. A MapTable Associator responds to object types as keys, and provides indications of object factories (i.e. fully qualified class names) as resulting values. MapTable Associators enable multiple, different object types to be mapped to the same object factory class, even within the same Associator. In the preferred embodiment, within a given Associator, any specific object type can be associated with one and only one object factory class. Alternatively, the method for obtaining an object factory class by object type may be embodied to return a set of object factory classes, leaving it to the invoking application to determine which specific object factory class instance to use. The MapTable Associators enable the binding of a set of object types used in a shared execution context to the respective classes providing their implementation. The shared execution context may be identified by the MapTable Associator's name, and the specific binding of a given object type to the class that implements it in the given Associator can be changed dynamically, at any time at all, either programmatically or interactively, while being subjected to access rights defined by the program that practices this invention.

2) Lookup Associators. A Lookup Associator contains a sequence of MapTable Associators. The first MapTable Associator containing a mapping for a requested object type is used to provide a corresponding object factory class back to the caller application. A Lookup Associator can be changed dynamically, at any time, either programmatically or interactively, subject to any access rights limitations defined by a program embodying the disclosed system.

3) Root Associators. Each application activates a get_default_associator service, once per each run, allowing the runtime environment to create a memory object being a single instance of an Associator, called the Root Associator. The, Root Associator may, for example, be implemented as a Lookup Associator, containing one or more MapTable Associators to be used within the lookup path.

At step 284 in FIG. 13, an object factory class, for example Object$_{X1}$Factory class, is programmed to generate objects, such as active objects ("Players") and/or reactive objects ("Infograms"), in a composite application of ObjectType X through use of an Object$_{X1}$Factory class. At step 286, an Object$_{X1}$ class is programmed to implement the methods and properties for Objects of ObjectType X. Also during Design-Time 280, at step 288 a MapTable Associator M1 304 is configured with regard to a number of key/value pairs that it contains. Each MapTable Associator in the illustrative embodiment of FIG. 13 includes some number of key/value pairs, such that a Key #1 is associated with a corresponding Value #1, a Key #2 is associated with a Value #2, etc. In step 288 of FIG. 13, a Key #n is configured to match Object Type X and the corresponding Value #n is configured to indicate the Object$_{X1}$Factory class. At step 290, a LookUp Associator L1 300 is configured to contain or indicate at least the MapTable Associator M1 304.

As further shown in FIG. 13, during the run time period 282, at step 292 a Composite Application CA1 defines the Lookup Associator L1 300 as its Root Associator. Next, at step 294, Composite Application CA1 requests an object instance during the course of its execution, for example an instance of ObjectType X referred to as Object X1. Then, at step 296, the runtime system activates Lookup Associator L1 300, and loads Object X1 of ObjectType X. For example, this action may include or result in instantiation 298 of Lookup Associator 300. As shown in FIG. 13, Lookup Associator 300 contains the MapTable Associator M1 304, and at step 302, as part of the run time system retrieving an instance of Object X the MapTable Associator M1 304 initiates a lookup for ObjectType X. The MapTable Associator M1 304 includes a map 306 that associates an ObjectType Type 1 with a corresponding factory class Factory 1, and a mapping 308 that associates an ObjectType Type 2 with a corresponding factory class Factory 2. The MapTable Associator M1 304 further includes the mapping 310 that associates the ObjectType X with the object factory class Object$_{X1}$Factory. The mapping 310 is used by the lookup 302 to activate 312 the Object$_{X1}$Factory, which loads Object X1 to satisfy the request from Composite Application CA1 at step 294. For example, if Object X1 already exists, it may be retrieved from memory. Alternatively, the Object X1 image may be recreated 316 from a persistently stored object image in persistent storage system 314.

Using the separation between Object definitions and Associator definitions provided by the disclosed system, it is advantageously possible to:

1) create multiple, different object definitions with respect to a single object type; and/or 2) create multiple, different Associators mapping object types to different object implementations, as presented by different corresponding object factories.

For example, in a first scenario, a painless change can be made to an existing composite application as follows:

a) an existing composite application is used, with an existing registry of Associators, and an existing database of persistent objects;

b) a developer develops his own implementations of one or more objects that he would like to behave differently—some of these may be new objects, others may be modified classifications of previously existing objects; and c) an update is performed to an Associator in the registry to map these specific object types to the object factories selected by the developer.

As a result, the re-used components will behave differently when they are executed, but no one had to change the inheritance graph, recompile, re-link, re-test with respect to non-affected objects, and/or redeploy the composite application.

In a second scenario, a new composite application can "inherit" an existing one, and amend the existing application's behavior with respect to certain object types, as follows:

1) an existing application and an existing registry of Associators is used;

2) a composite application developer develops her own implementation of one or more objects she would like to behave differently;

3) the developer adds a new MapTable Associator to the registry, mapping these specific object types to object factories selected by the developer; and 4) the existing Lookup Associator is changed by adding the new MapTable Associator to the head of the MapTable sequence, thereby making it the first to be selected as a default associator method, for example get_default_assosicator. Alternatively, the existing Lookup Associator could be left as-is, and a new Lookup Associator could be defined to provide the desired changes, and defined as the Root Associator. As a result, the new composite application executes just like the previously existing application, albeit while behaving differently when processing the revised objects.

Figure 14:
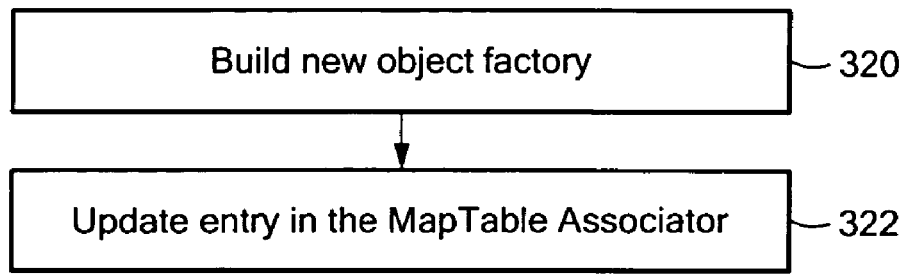
FIG. 14 is a flow chart illustrating steps performed to dynamically change the binding of an object type in an illustrative embodiment.

As shown in FIG. 14, an embodiment of the disclosed system may operate to dynamically change the binding of an object type as needed to provide an effective composite application. The steps shown in FIG. 14 provide an object type with a different implementation, by dynamically changing the object types binding its binding, while avoiding deployment related issues associated with prior systems that rely on inheritance graphs. At step 320, a new object factory is built, for example, Object$_{X2}$Factory class in the illustrative embodiment. At step 322, the entry in the MapTable Associator, for example MapTable Associator M1, for the relevant object type, for example ObjectType X, is modified to indicate the new object factory. As a result of these steps, the binding of an object type to an object factory class is conveniently changed as needed for a given composite application, while leaving the compile-time class structure and inheritance graph intact.

Figure 15:
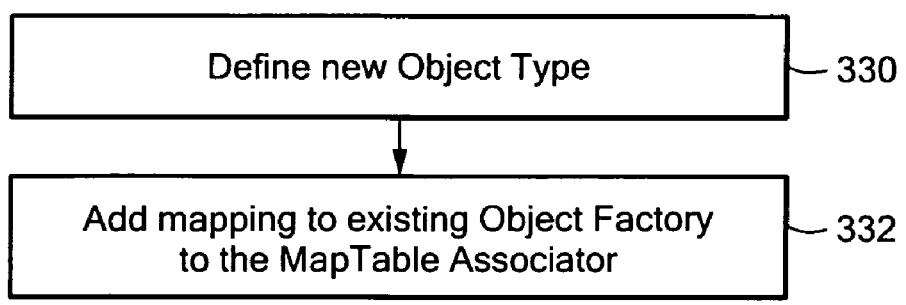
FIG. 15 is a flow chart illustrating steps to reuse an object implementation by registering multiple object types with the same object factory in an illustrative embodiment.

As shown in FIG. 15, an embodiment of the disclosed system may operate to reuse an object implementation by registering multiple object types with the same object factory class. At step 330, a new object type is defined, for example ObjectType Y. At step 332, a mapping for the new object type is added to the MapTable Associator. For example, a mapping of the new ObjectType Y to a previously existing object factory class Object$_{X1}$factory as a new key/value pair.

Figure 16:
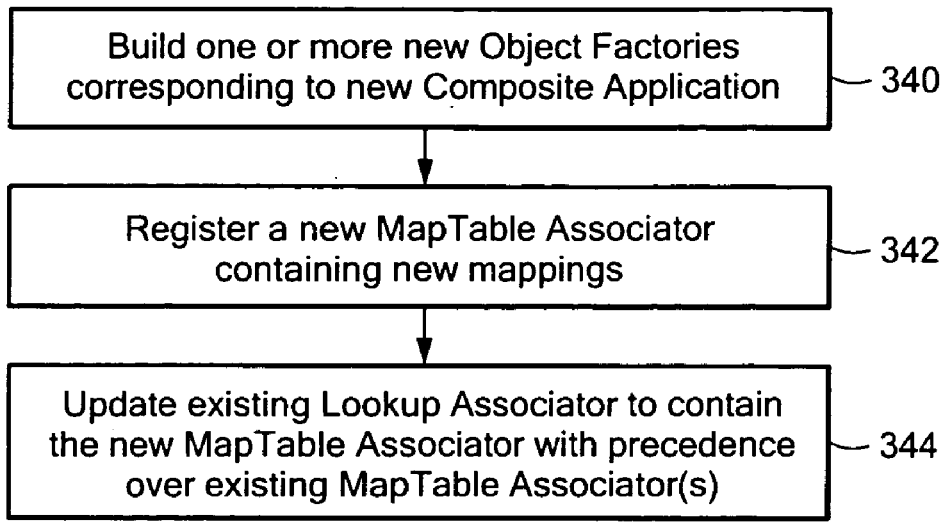
FIG. 16 is a flow chart illustrating steps to reuse and extend a composite application by having the Lookup Associator control the integration process in an illustrative embodiment.

FIG. 16 shows how an illustrative embodiment may operate to reuse and extend a software-based system made up of composite applications compliant with the present invention by having a Lookup Associator control the integration process. In such a case, an existing system may include many sub-systems, each managing a different set of objects. Developers may want to implement a new composite application using one or more such sub-systems of the existing system, and integrate and test the composite application without touching or breaking the complete existing set of sub-systems. At step 340, one or more new object factories are built. For example, a new Object$_{X2}$factory implementing an existing ObjectType X may be built at step 340. At step 342, the new object factory is mapped to the existing object type. For example, a new MapTable Associator M2 containing new mappings of ObjectType X to Object$_{X2}$factory may be registered at step 342. An existing Lookup Associator, such as Lookup Associator L1, is then updated to contain the new MapTable Associator with precedence over one or more previous MapTable Associators. For example, this may be accomplished by changing the MapTables list within Lookup Associator L1 from (M1) to (M2, M1), thereby allowing the new MapTable M2 to take precedence over the previous MapTable M2. If a failure occurs or a bug is detected, and/or there is uncertainty regarding the source of some new problem, either the new MapTable Associator M2 can be removed from Lookup Associator L1, or MapTable Associator M2 can conveniently be removed from Lookup Associator L1, and the existing system can resume operation without the modifications.

Figure 17:
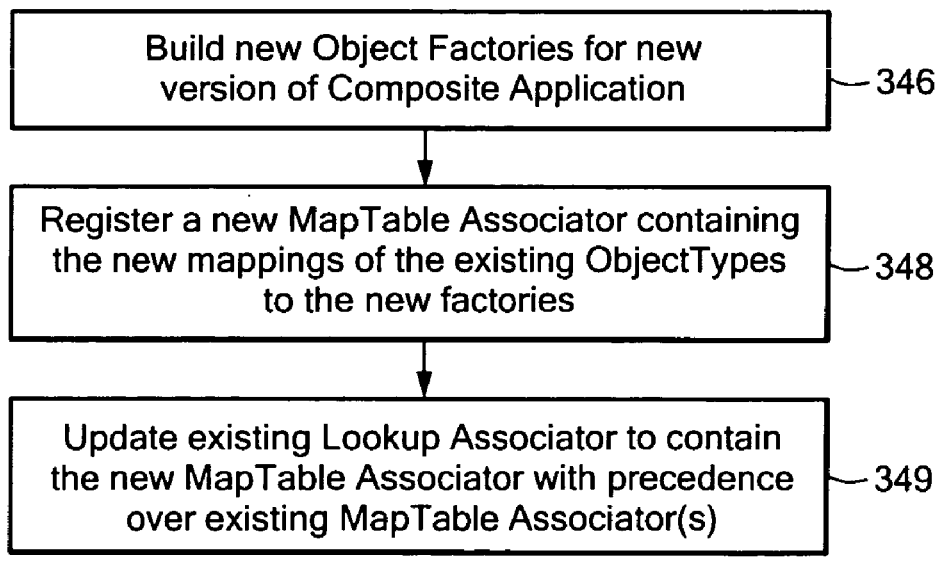
FIG. 17 is a flow chart further illustrating steps to manage changes in a composite application by having the Lookup Associator control the staging process in an illustrative embodiment.

FIG. 17 show steps to manage changes in a software-based system by having a Lookup Associator control the staging process. This process may be used when Version 1 of the composite application is deployed in the field, a Version 2 has been developed, and the goal is to deploy Version 2 incrementally without interrupting the operation of Version 1. At step 346, new Object Factories are built for the new version of the software system. For example, New Object Factories for a Version 2 of a composite application may include new Object Factories Object$_{X2}$factory through Object$_{Z2}$factory implementing existing ObjectTypes X through Z. At step 348, a new MapTable Associator is registered containing mappings to the new Object Factories. For example, a new MapTable Associator M2 may be registered containing new mappings of ObjectTypes X through Z to the new Object Factories. Next, at step 349, a Lookup Associator is updated by adding the new MapTable Associator to its list of MapTable Associators, with priority over one or more existing MapTable Associators. For example, at step 349, a Lookup Associator L1 may be updated by changing the MapTable list it contains from (M1) to (M2, M1) thereby allowing the new MapTable M2 to take precedence over the existing MapTable M1.

Figure 18:
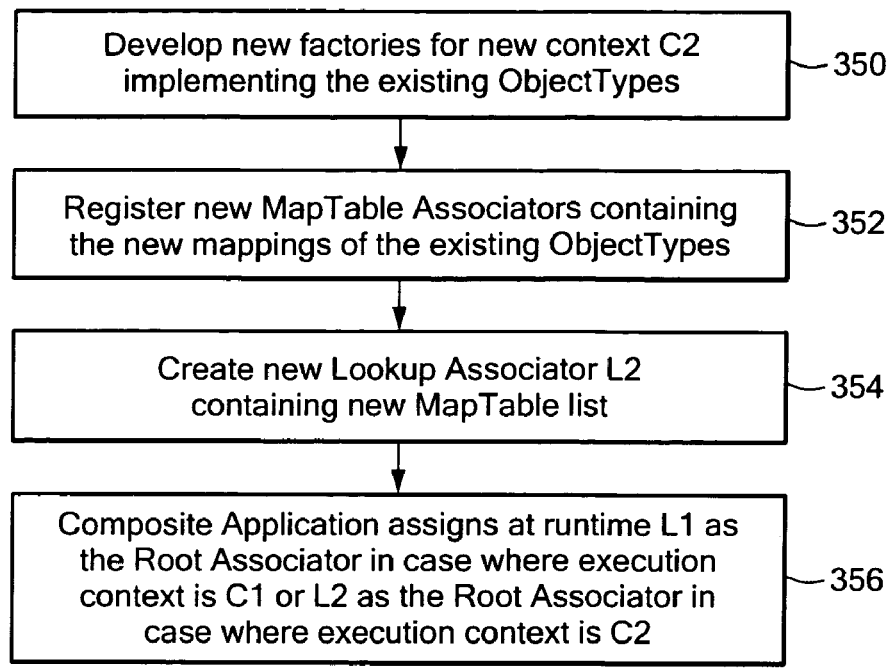
FIG. 18 is a flow chart illustrating steps to enable the same object type to be applied differently in different situations within the same composite application, using multiple Lookup Associators by assigning different Root Associators in different contexts.

FIG. 18 is a flow chart illustrating steps to enable the same object type to be applied differently in different situations within the same composite application, using multiple Lookup Associators by assigning different Root Associators in different execution contexts. In this process, multiple Lookup Associators can be used by assigning different Root Associators in different contexts. For example, existing implementations of ObjectTypes X . . . Z may need to be limited to a Context C1, which may be related to a single supplier or set of providers, or to any specific runtime context an application system may need to independently manage, and there may be a need to enable a new context C2. This may be the case for a large system whose development is split up among several developer teams, each one managing its own MapTable Associators M through P, so that the current Lookup Associator L1 contains MapTable Associator list (M,N,O,P). Accordingly, at step 350, new factories for the new context C2 are developed. For example, new factories Object$_{X2}$factory through Object$_{Z2}$factory may be developed implementing existing ObjectTypes X through Z. Then at step 352, one or more new MapTable Associators (i.e. M2,N2,O2, P2) are registered containing the new mappings of the existing ObjectTypes to the new Object Factories, for use during the context C2. At step 354 a new Lookup Associator (i.e. L2) is created containing the new MapTable list (M2,N2,O2,P2). Then, at step 356, during runtime, the composite application assigns L1 as the Root Associator in when the execution context is C1, and L2 as the Root Associator when the execution context is C2.

Figure 19:
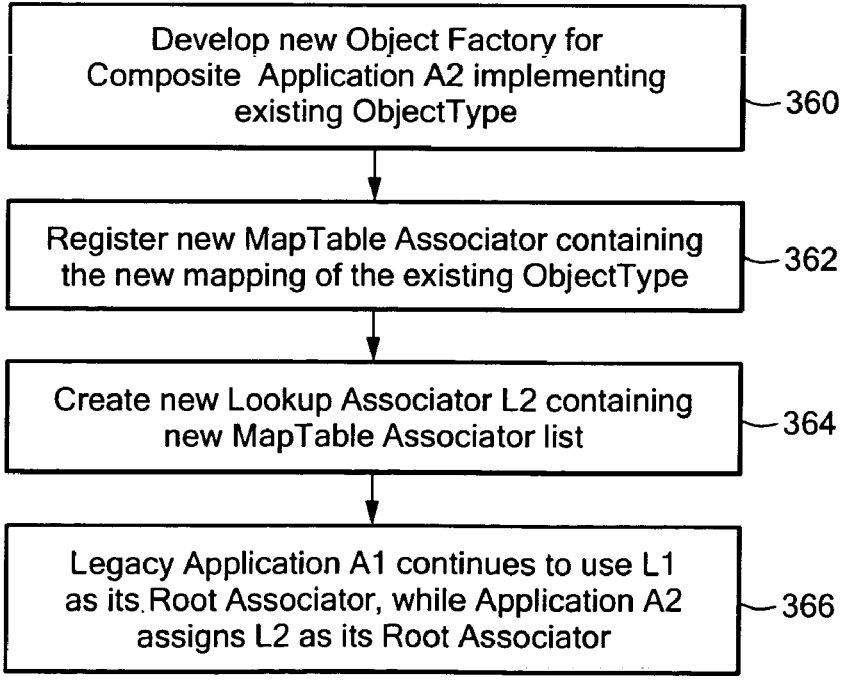
FIG. 19 is a flow chart illustrating steps to enable a new application to reuse an existing mapping but override the existing mapping with regard to a subset of its objects by using multiple Lookup Associators, and multiple Root Associators.

FIG. 19 is a flow chart illustrating steps to enable a new composite application to reuse an existing mapping but override the existing mapping with regard to a subset of its objects by using multiple Lookup Associators, and multiple Root Associators. This process may be used where there is an existing or legacy Application A1, for example an Internal system, and there is a need for a new composite Application A2, for example that is open to external users. Again, this may be the case where there a large system whose development is split into several teams, each one managing its own MapTable Associators (M,N,O,P), and where an existing Lookup Associator L1 contains a MapTable list (M,N,O,P). As shown in FIG. 19, at step 360, a new Object Factory (i.e. Object$_{X2}$Factory) is developed implementing an existing ObjectType (i.e. ObjectType X). A step 362 a new MapTable Associator (i.e. M2) is registered containing the new mapping of the existing ObjectType X to the new Object Factory (Object$_{X2}$factory). Next, at step 364 a new Lookup Associator (i.e. L2) is created containing a MapTable Associator list including the new MapTable Associator M2, having precedence over the MapTable Associators in the existing Lookup Associator L1. For example, the MapTable Associator list in Lookup Associator L2 may be (M2,M,N,O,P), with the new MapTable Associator M2 mappings having precedence over the mappings in the MapTable Associators (M,N,O,P) in the L1 MapTable list. Then at step 366, during runtime, the Legacy Application A1 continues to use Lookup Associator L1 as its Root Associator, while Composite Application A2 assigns L2 as its Root Associator.

The Figures include block diagrams and flow chart illustrations of methods, apparatus (systems) and computer program products according to an embodiment of the invention. It will be understood that each block of the Figures, and combinations of these blocks, can be implemented by computer program instructions. These computer program instructions may be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative program object structures, one skilled in the art will recognize that the system may be embodied using a variety of specific program object structures. Accordingly, the invention should not be viewed as limited except by the scope and spirit of the appended claims.

The invention claimed is:

1. A computer system including at least one processor and a computer readable memory, said computer readable memory having stored thereon program code for providing at least one composite application, said program code comprising:
   a plurality of program objects each having a predefined object type consisting of an active program object type, wherein each program object of said active program object type is associated with a single corresponding user, wherein said corresponding user is an individual person, and wherein each program object of said active program object type uniquely activates at least one associated service on behalf of its corresponding user; and
   a software construct for dynamically defining a correspondence between at least one input object type and corresponding object generating program code, wherein said at least one input object type includes said active program object type, wherein said corresponding object generating program code generates object instances of said object type, and for selecting, at run-time, said corresponding object generating program code from among a plurality of alternative, run-time selectable object generating programs, wherein each of said plurality of run-time selectable object generating programs generates object instances of said input object type, and wherein said correspondence between said input object type and said corresponding object generating program code is maintained independently from a pre-run time program code object hierarchy.

2. The system of claim 1, wherein said active program object type is one of two predefined object types, said two predefined object types consisting of said active program object type and a reactive program object type, and wherein each program object of said reactive program object type is owned by a single program object of said active program object type.

3. The system of claim 2, wherein said software construct operative to dynamically define said correspondence between said at least one input object type and said corresponding object generating program code is further operative to change said correspondence from between said input object type and a first corresponding object generating program code to between said input object type and a second corresponding object generating program code.

4. The system of claim 3, wherein said software construct is further operative to change said correspondence responsive to one of said program objects of said active program object type.

5. The system of claim 3, wherein said software construct is further operative to change said correspondence responsive to one of a plurality of program objects of said reactive program object type.

6. The system of claim 2, wherein each program object of said reactive program object type is owned by a single program object of said active program object type at any given time.

7. The system of claim 1, wherein said pre-run time program code object hierarchy comprises a compile time program code object hierarchy.

8. The system of claim 1 wherein said pre-run time program code object hierarchy comprises a link time program code object hierarchy.

9. The system of claim 2, wherein each program object of said reactive program object type is processed by at least one program object of said active program object type.

10. The system of claim 2, wherein each program object of said reactive program object type is instantiated by at least one program object of said active program object type.

11. The system of claim 2, wherein at least one program object of said reactive program object type includes context data within a run-time execution space that is private to said program object of said reactive program object type, and wherein said software construct operative to dynamically define said correspondence between said at least one input object type and corresponding object generating program code is operative to determine said correspondence responsive to said context data.

12. The system of claim 1, wherein at least one program object of said active program object type includes context data within a run-time execution space that is private to said program object of said active program object type, and wherein said software construct operative to dynamically define said correspondence between said at least one input object type and corresponding object generating program code is operative to determine said correspondence responsive to said context data.

13. The system of claim 2, wherein at least one program object of said reactive program object type includes context data within a run-time execution space that is private to said program object of said reactive program object type, and wherein said context data defines said at least one composite application.

14. A method for providing at least one composite application, comprising:
   providing a plurality of program objects each having a predefined object type consisting of an active program object type, wherein each program object of said active program object type is associated with a single corresponding user, wherein said corresponding user is an individual person, and wherein each program object of said active program object type uniquely activates at least one associated service on behalf of its corresponding user; and defining a correspondence between at least one input object type and corresponding object generating program code, wherein said at least one input object type includes said active program object type, wherein said corresponding object generating program code generates object instances of said input object type, and for selecting, at run-time, said corresponding object generating program code from among a plurality of alternative, run-time selectable object generating programs, wherein each of said plurality of run-time selectable object generating programs generates object instances of said input object type, and wherein said correspondence between said input object type and said corresponding object generating program code is maintained independently from a pre-run time program code object hierarchy.

15. The method of claim 14, wherein said active program object type is one of two predefined object types, said two predefined object types consisting of said active program object type and a reactive program object type, and wherein each program object of said reactive program object type is owned by a single program object of said active program object type.

16. The method of claim 15, further comprising dynamically changing said correspondence from between said input object type and a first corresponding object generating program code to between said input object type and a second corresponding object generating program code at run time.

17. The method of claim 16, further comprising dynamically changing said correspondence at run time responsive to one of said program objects of said active program object type.

18. The method of claim 16, further comprising dynamically changing said correspondence at run time responsive to one of a plurality of program objects of said reactive program object type.

19. The method of claim 15, wherein each program object of said reactive program object type is owned by a single program object of said active program object type at any given time.

20. The method of claim 14, wherein said pre-run time program code object hierarchy comprises a compile time program code object hierarchy.

21. The method of claim 14 wherein said pre-run time program code object hierarchy comprises a link time program code object hierarchy.

22. The method of claim 15, further comprising processing each program object of said reactive program object type by at least one program object of said active program object type.

23. The method of claim 15, wherein each program object of said reactive program object type is instantiated by at least one program object of said active program object type.

24. The method of claim 15, wherein at least one program object of said reactive program object type includes context data within a run-time execution space that is private to said program object of said reactive program object type, and wherein said correspondence between said at least one input object type and corresponding object generating program code is determined responsive to said context data.

25. The method of claim 14, wherein at least one program object of said active program object type includes context data within a run-time execution space that is private to said program object of said active program object type, and wherein said correspondence between said at least one input object type and corresponding object generating program code is responsive to said context data.

26. The method of claim 15, wherein at least one program object of said reactive program object type includes context data within a run-time execution space that is private to said program object of said reactive program object type, and wherein said context data defines said at least one composite application.

27. A computer program product including a computer readable storage medium, said computer storage readable medium having program code for providing at least one composite application stored thereon, said program code comprising:

program code operative to provide a plurality of program objects each having a predefined object type consisting of an active program object type, wherein each program object of said active program object type is associated with a single corresponding user, wherein said corresponding user is an individual person, and wherein each program object of said active program object type uniquely activates at least one associated service on behalf of its corresponding user; and program code for dynamically defining a correspondence between at least one input object type and corresponding object generating program code, wherein said at least one input object type includes said active program object type, wherein said corresponding object generating program code generates object instances of said input object type, and for selecting, at run-time, said corresponding object generating program code from among a plurality of alternative, run-time selectable object generating programs, wherein each of said plurality of run-time selectable object generating programs generates object instances of said input object type, and wherein said correspondence between said input object type and said corresponding object generating program code is maintained independently from a pre-run time program code object hierarchy.

28. The computer program product of claim 27, wherein said active program object type is one of two predefined object types, said two predefined object types consisting of said active program object type and a reactive program object type, and wherein each program object of said reactive program object type is owned by a single program object of said active program object type.

29. The computer program product of claim 28, further comprising program code operative to dynamically change said correspondence from between said input object type and a first corresponding object generating program code to between said input object type and a second corresponding object generating program code at run time.

30. The computer program product of claim 29, further comprising program code operative to dynamically change said correspondence at run time responsive to one of said program objects of said active program object type.

31. The computer program product of claim 29, further comprising program code operative to dynamically change said correspondence at run time responsive to one of a plurality of program objects of said reactive program object type.

32. The computer program product of claim 28, wherein each program object of said reactive program object type is owned by a single program object of said active program object type at any given time.

33. The computer program product of claim 27, wherein said pre-run time program code object hierarchy comprises a compile time program code object hierarchy.

34. The computer program product of claim 27 wherein said pre-run time program code object hierarchy comprises a link time program code object hierarchy.

35. The computer program product of claim 28, further comprising program code operative to process each program object of said reactive program object type by at least one program object of said active program object type.

36. The computer program product of claim 28, wherein each program object of said reactive program object type is instantiated by at least one program object of said active program object type.

37. The computer program product of claim 28, wherein at least one program object of said reactive program object type includes context data within a run-time execution space that is private to said program object of said reactive program object type, and wherein said determining said correspondence between said at least one input object type and corresponding object generating program code is responsive to said context data.

38. The computer program product of claim 27, wherein at least one program object of said active program object type includes context data within a run-time execution space that is private to said program object of said active program object type, and wherein said determining said correspondence between said at least one input object type and corresponding object generating program code is responsive to said context data.

39. The computer program product of claim 28, wherein at least one program object of said reactive program object type includes context data within a run-time execution space that is private to said program object of said reactive program object type, and wherein said context data defines said at least one composite application.

40. A computer system including at least one processor and a computer readable memory, said computer readable memory having stored thereon program code for providing at least one composite application, said program code comprising:
   means for providing a plurality of program objects each having a predefined object type consisting of an active program object type, wherein each program object of said active program object type is associated with a single corresponding user, wherein said corresponding user is an individual person, and wherein each program object of said active program object type uniquely activates at least one associated service on behalf of its corresponding user; and
   means for dynamically defining a correspondence between at least one input object type and corresponding object generating program code, wherein said at least one input object type includes said active program object type, wherein said corresponding object generating program code generates object instances of said input object type, and for selecting, at run-time, said corresponding object generating program code from among a plurality of alternative, run-time selectable object generating programs, wherein each of said plurality of run-time selectable object generating programs generates object instances of said input object type, and wherein said correspondence between said input object type and said corresponding object generating program code is maintained independently from a pre-run time program code object hierarchy.

41. The system of claim 40, wherein said active program object type is one of two predefined object types, said two predefined object types consisting of said active program object type and a reactive program object type, and wherein each program object of said reactive program object type is owned by a single program object of said active program object type.

42. The system of claim 41, further comprising means for dynamically changing said correspondence from between said input object type and a first corresponding object generating program code to between said input object type and a second corresponding object generating program code at run time.

43. The system of claim 42, further comprising means for dynamically changing said correspondence at run time responsive to one of said program objects of said active program object type.

44. The system of claim 42, further comprising means for dynamically changing said correspondence at run time responsive to one of a plurality of program objects of said reactive program object type.

45. The system of claim 42, wherein each program object of said reactive program object type is owned by a single program object of said active program object type at any given time.

46. The system of claim 40, wherein said pre-run time program code object hierarchy comprises a compile time program code object hierarchy.

47. The system of claim 40 wherein said pre-run time program code object hierarchy comprises a link time program code object hierarchy.

48. The system of claim 41, further comprising means for processing each program object of said reactive program object type by at least one program object of said active program object type.

49. The system of claim 42, wherein each program object of said reactive program object type is instantiated by at least one program object of said active program object type.

50. The system of claim 41, wherein at least one program object of said reactive program object type includes context data within a run-time execution space that is private to said program object of said reactive program object type, and wherein said correspondence between said at least one input object type and corresponding object generating program code is determined responsive to said context data.

51. The system of claim 40, wherein at least one program object of said active program object type includes context data within a run-time execution space that is private to said program object of said active program object type, and wherein said correspondence between said at least one input object type and corresponding object generating program code is responsive to said context data.

52. The system of claim 41, wherein at least one program object of said reactive program object type includes context data within a run-time execution space that is private to said program object of said reactive program object type, and wherein said context data defines said at least one composite application.

53. A computer system including at least one processor and a computer readable memory, said computer readable memory having program code stored thereon for providing a new composite application, said program code comprising:
   a plurality of program objects each having a predefined object type consisting of an active program object type, wherein each program object of said active program object type is associated with a single corresponding user, wherein said corresponding user is an individual person, wherein each program object of said active program object type uniquely activates at least one associated service on behalf of its corresponding user, and wherein at least one program object of said active program object type includes context data within a run-time execution space that is private to said program object of said active program object type;

a software construct for operative to dynamically defining a correspondence between at least one input object type and corresponding object generating program code, wherein said at least one input object type includes said active program object type, wherein said corresponding object generating program code generates object instances of said input object type, and for selecting, at run-time, said corresponding object generating program code from among a plurality of alternative, run-time selectable object generating programs, wherein each of said plurality of run-time selectable object generating programs generates object instances of said input object type, and wherein said correspondence between said input object type and said corresponding object generating program code is maintained independently from a pre-run time program code object hierarchy; and program code for providing said new composite application by loading data associated with said new composite application into said context data of said at least one program object of said active program object type.

54. A method for providing a new composite application, comprising:

providing a plurality of program objects each having a predefined object type consisting of an active program object type, wherein each program object of said active program object type is associated with a single corresponding user, wherein said corresponding user is an individual person, and wherein each program object of said active program object type uniquely activates at least one associated service on behalf of its corresponding user, wherein at least one program object of said active program object type includes context data within a run-time execution space that is private to said program object of said active program object type;

defining a correspondence between at least one input object type and corresponding object generating program code, wherein said at least one input object type includes said active program object type, wherein said corresponding object generating program code generates object instances of said input object type, and for selecting, at run-time, said corresponding object generating program code from among a plurality of alternative, run-time selectable object generating programs, wherein each of said plurality of run-time selectable object generating programs generates object instances of said input object type, and wherein said correspondence between said input object type and said corresponding object generating program code is maintained independently from a pre-run time program code object hierarchy; and providing said new composite application by loading data associated with said new composite application into said context data of said at least one program object of said active program object type.

55. A computer program product including a computer readable memory, said computer readable memory having program code for providing a new composite application stored thereon, said program code comprising:

program code operative to provide a plurality of program objects each having a predefined object type consisting of an active program object type, wherein each program object of said active program object type is associated with a single corresponding user, wherein said corresponding user is an individual person, wherein each program object of said active program object type uniquely activates at least one associated service on behalf of its corresponding user, and wherein at least one program object of said active program object type includes context data within a run-time execution space that is private to said program object of said active program object type;

program code for dynamically defining a correspondence between at least one input object type and corresponding object generating program code, wherein said at least one input object type includes said active program object type, wherein said corresponding object generating program code generates object instances of said input object type, and for selecting, at run-time, said corresponding object generating program code from among a plurality of alternative, run-time selectable object generating programs, wherein each of said plurality of run-time selectable object generating programs generates object instances of said input object type, and wherein said correspondence between said input object type and said corresponding object generating program code is maintained independently from a pre-run time program code object hierarchy; and program code operative to provide said new composite application by loading data associated with said new composite application into said context data of said at least one program object of said active program object type.

56. A computer system including at least one processor and a computer readable memory, said computer readable memory having program code stored thereon for providing a new composite application, said program code comprising:

means for providing a plurality of program objects each having a predefined object type consisting of an active program object type, wherein each program object of said active program object type is associated with a single corresponding user, wherein said corresponding user is an individual person, wherein each program object of said active program object type uniquely activates at least one associated service on behalf of its corresponding user, and wherein at least one program object of said active program object type includes context data within a run-time execution space that is private to said program object of said active program object type;

means for dynamically defining a correspondence between at least one input object type and corresponding object generating program code, wherein said at least one input object type includes said active program object type, wherein said corresponding object generating program code generates object instances of said input object type, and for selecting, at run-time, said corresponding object generating program code from among a plurality of alternative, run-time selectable object generating programs, wherein each of said plurality of run-time selectable object generating programs generates object instances of said input object type, and wherein said correspondence between said input object type and said corresponding object generating program code is maintained independently from a pre-run time program code object hierarchy; and means for providing said new composite application by loading data associated with said new composite application into said context data of said at least one program object of said active program object type.

* * * * *